United States Patent
Koningen et al.

(10) Patent No.: US 7,604,793 B2
(45) Date of Patent: Oct. 20, 2009

(54) IRON OXIDE PRECIPITATION FROM ACIDIC IRON SALT SOLUTIONS

(75) Inventors: Darren Koningen, Don Mills (CA); William J. Freund, Silverthorne, CO (US); David Bruce Dreisinger, Delta (CA)

(73) Assignee: Metalox International, Breckenridge, CO (US)

(*) Notice: Subject to any disclaimer, the term of this patent is extended or adjusted under 35 U.S.C. 154(b) by 0 days.

(21) Appl. No.: 10/569,904

(22) PCT Filed: Apr. 29, 2005

(86) PCT No.: PCT/CA2005/000654

§ 371 (c)(1),
(2), (4) Date: May 7, 2008

(87) PCT Pub. No.: WO2005/106053

PCT Pub. Date: Nov. 10, 2005

(65) Prior Publication Data

US 2008/0206127 A1    Aug. 28, 2008

Related U.S. Application Data

(63) Continuation-in-part of application No. 10/834,522, filed on Apr. 29, 2004, now Pat. No. 7,399,454.

(51) Int. Cl.
C01G 49/06 (2006.01)

(52) U.S. Cl. .................................................. 423/633

(58) Field of Classification Search ................ 423/633, 423/579, 592.1, 594.1, 632; 106/456
See application file for complete search history.

(56) References Cited

U.S. PATENT DOCUMENTS 2,643,204 A    6/1953    Mancke (Continued)

FOREIGN PATENT DOCUMENTS

CA    2156295    9/1994
JP    56-129615    10/1981

OTHER PUBLICATIONS

Product information: Bayferrox (r) 105M; Ianxess energizing company, 2008.*

(Continued)

*Primary Examiner*—Wayne Langel
*Assistant Examiner*—Syed Iqbal
(74) *Attorney, Agent, or Firm*—Bret E. Field; Bozicevic, Field & Francis, LLP

(57) ABSTRACT

Improved methods for treating metallurgical compositions involve reacting a metallurgical composition with an aqueous nitric acid solution. The reaction is performed at a pressure or at least about 220 psig and at a temperature of at least 100° C. The metallurgical composition comprises iron and one or more non-ferrous metals. The reaction dissolves at least a portion of the non-ferrous metal compositions into the solution which is in contact with solid ferric oxide. The reaction can be repeated on the isolated solids to increase the purity of ferric oxide in the solids. Zinc can be removed from mixed metal solutions obtained from furnace dust by adding base to precipitate zinc hydroxide.

21 Claims, 8 Drawing Sheets

U.S. PATENT DOCUMENTS

| | | | |
|---|---|---|---|
| 2,762,703 A | | 9/1956 | Mancke |
| 2,916,357 A | * | 12/1959 | Schaufelberger ............ 423/141 |
| 4,097,271 A | | 6/1978 | Swinkels et al. |
| 4,282,190 A | | 8/1981 | Müller et al. |
| 4,414,196 A | * | 11/1983 | Matsumoto et al. ......... 423/633 |
| 5,912,402 A | | 6/1999 | Drinkard, Jr. et al. |
| 6,159,435 A | * | 12/2000 | Nguyen ........................ 423/3 |
| 6,616,747 B2 | * | 9/2003 | Sumita ....................... 106/456 |

OTHER PUBLICATIONS

Voigt, B. and Gobler, A., "Formation of Pure Hematite by Hydrolysis of Iron (III) Salt Solutions Under Hydrothermal Conditions", *Crystal Research Technology*, vol. 21, 1986; pp. 1177-1183.

\* cited by examiner

IRON OXIDE PRECIPITATION FROM ACIDIC IRON SALT SOLUTIONS

This application is a continuation-in-part of U.S. application Ser. No. 10/834,522 filed Apr. 29, 2004 now U.S. Pat. No. 7,399,454, and claims the benefit thereof.

FIELD OF INVENTION

The present invention relates to hydrometallurgical chemistry. More particularly, the invention relates to acid leaching of iron salts, and precipitation of selected hematites from a solution of iron salts.

BACKGROUND OF THE INVENTION

Scrap metal can be recycled into quality steel using an electric arc furnace (EAF). In an EAF, the scrap metal is melted with electric arcs formed to the scrap metal. The scrap metal can include small amounts of non-ferrous metal and the like. The EAF process operates as a batch melting process, producing batches of molten steel. The EAF is a highly effective melting apparatus. A significant fraction of steel produced in the U.S. is produced with an electric arc furnace.

However, a drawback in the EAF manufacture of steel is the production of EAF metallurgical dust waste by-products. EAF dust is generated during the steel making process by a variety of mechanisms, including droplet ejection from the turbulent melt and vaporization. The vaporization mechanism is primarily responsible for the relatively high proportion of the non-ferrous metals in the dust such as zinc, lead, tin, chromium, copper and cadmium. The vaporized metals condense as oxides and ferrites and generally are collected downstream in a baghouse and/or electrostatic precipitator. Due to the presence of non-ferrous metals in the dust, the furnace dust cannot be directly recycled. The production of 1 ton of steel can generate approximately 34 pounds (15.4 kg) of waste EAF metallurgical dust.

The rapid growth of the EAF steel process has made EAF metallurgical dust one of the fastest growing and one of the most significant environmental problems worldwide. At present, there are approximately 600,000 metric tons of EAF waste generated annually in the USA and an additional 600,000 metric tons generated annually in the rest of the world. There are also similar quantities of metallurgical dust at a lower level of contamination that is derived from the other major process for steel manufacturing, the Basic Oxygen Furnace (BOF). Because the levels of toxic metals such as cadmium, lead and zinc are lower in BOF metallurgical dust, BOF dust is not currently classified by the EPA as hazardous. However, BOF metallurgical dust has non-iron contaminants that make it difficult to utilize it in current steel manufacture. Thus, BOF metallurgical dust may end up as unused waste.

EAF metallurgical dust may contain high concentrations of iron (approximately 25%), zinc (approximately 25%), lead (approximately 5%), and smaller amounts of tin, cadmium, chromium and copper. The remainder of the dust is silica, lime and alumina. The nonferrous values represent potentially rich sources of metal values. Due to the presence of potentially hazardous metals, such as lead, chromium and cadmium, the EAF dust cannot be disposed in landfills since the hazardous metals may leach out due to rain or underground water to contaminate neighboring water sheds. Thus, the processing of the dust is an important commercial and environmental issue. Some specific examples of metal content for three samples of EAF dust are presented in Table 1.

TABLE 1

SAMPLE PLANT EAF DUST CONSTITUENTS FOR THREE DIFFERENT SAMPLES.

| | % Zn | % Al | % Pb | % Fe | % Cd | % Cu | % Mn | % Na | % Ba |
|---|---|---|---|---|---|---|---|---|---|
| 1 | 20.3 | 0.27 | 1.27 | 36.0 | 0.02 | 016 | 3.54 | 0.59 | 0.01 |
| 2 | 22.7 | 0.30 | 1.04 | 34.8 | 0.01 | 0.13 | 3.60 | 0.70 | 0.01 |
| 3 | 27.0 | — | 1.4 | 26.0 | 0.081 | — | 3.4 | — | — |

| | % CaO | % Cr | % Mg | % Ni | % V | % As | % SiO2 | % Cl |
|---|---|---|---|---|---|---|---|---|
| 1 | 5.51 | 0.20 | 2.06 | 0.02 | 0.01 | .0036 | 2.52 | 0.96 |
| 2 | 5.48 | 0.20 | 2.48 | 0.13 | 0.02 | .0029 | 4.74 | 0.78 |
| 3 | — | 0.25 | — | — | — | — | — | — |

SUMMARY OF THE INVENTION

The invention provides a method and an apparatus for converting hazardous metallurgical dust into manageable chemical products, such as non-toxic waste and/or marketable chemical products. Methods described herein can be based upon leaching of metallurgical dust at elevated pressure and temperature with nitric acid and the recovery of ferric oxide. The leaching step can be repeated to further purify the resulting ferric oxide solids. Also, one or more preliminary purification steps can be performed. Zinc can be removed from mixed metal solutions obtained from furnace dust by adding base to precipitate zinc hydroxide.

In a first aspect, the invention pertains to a method of reacting a metallurgical composition with an aqueous nitric acid solution. The reaction is performed at a pressure of at least about 220 psig and at a temperature of at least 100° C. The metallurgical composition comprises iron and one or more non-ferrous metals. The reaction dissolves at least a portion of the non-ferrous metal compositions into the solution which is in contact with solid ferric oxide.

In another aspect, the invention pertains to a method for precipitating ferric oxide comprising subjecting an aqueous ferric nitrate solution to a temperature of at least about 100° C. at a pressure of at least about 220 psig.

In a further aspect, the invention pertains to an apparatus for treating metallurgical dust comprising a sealed pressure vessel at a pressure of at least about 220 psig holding a mixture of a metallurgical composition comprising at least iron and a solution of nitric acid.

In an additional aspect, the invention pertains to a method for isolating zinc from a mixed metal solution obtained from furnace dust, the method comprising adding base to precipitate zinc hydroxide.

As outlined above, iron in solution at elevated temperature and pressure hydrolyzes and is precipitated as iron oxide. EAF dust is leached in nitric acid at high temperatures and pressures and then re-precipitates as solid ferric oxide. The non-iron metals from the EAF dust are dissolved in solution leaving a solid precipitate, containing iron as ferric oxide. This process was demonstrated to be effective for separating the iron from "non-iron" metals. However, insoluble compounds in the dust (i.e., silicates) remain with the ferric oxide and may alter the colour properties of the ferric oxide solids obtained by this process.

Alternatively, it was unexpectedly found that modifications of the above-described process resulted in the production of pigment grade ferric oxides. The process outlined above was modified to completely solubilize the iron and other metals so that insoluble components could be removed from the system. The solution is subjected to high temperature and pressure to precipitate pigment grade ferric oxides.

In one embodiment of the modified process, ferric oxide solids precipitate from an iron-containing metal nitrate solution subjected to elevated temperature and pressure. Precipitates obtained from this modified process are black solids about 20 to 30 microns in diameter. X-ray diffraction analysis identifies these solids as hematite (ferric oxide) which is the same compound contained in synthetic red iron oxide pigments. When examined by scanning electron microscopy, the particles of the black precipitates do not appear spherical (as occurs with red iron oxide pigments) and instead appear like grape clusters comprised of many smaller particles connected together. The different crystal structure of the clustered particles causes light to reflect differently making them appear dark and preventing their use as red iron oxide pigment.

Alternatively, a further modification of the already modified process can be utilized. In another embodiment, a seed solid is added to the iron salt solution and subjected to elevated temperature and pressure to result in the hydrolysis of iron to pigment grade ferric oxide solids. Pigment grade hematite is generally comprised of fine particles having an average size of less than 2 microns and are red in colour. Seeding is commonly used in the metallurgical fields to allow precipitation products to grow and become larger in size. Unexpectedly it was found that following the addition of ferric oxide (hematite) seed to a iron salt solution, the precipitated particles are finer than the black precipitates obtained from unseeded reactions. It was also unexpectedly found that the more seed material used, the finer the precipitates were. The precipitates obtained by the seeded process are generally less than 2 microns in size, although coarser products are possible. Scanning electron micrographs of the precipitates from the seeded process reveal that they are generally spherical in nature. This is in contrast to the precipitates comprising hematite particles obtained from the modified but unseeded process. Unexpectedly, the seeded process results in the production of iron solid precipitates, iron oxides, that have size and colour characteristics which make them desirable for use as synthetic iron oxide pigments.

In various embodiments, there is provided a process for the production of ferric oxide precipitates having a selected particle size, comprising selecting a combination of a temperature and a seeding ratio, and conducting said process at pressures above atmospheric to obtain ferric oxide precipitates of the selected particle size.

DETAILED DESCRIPTION

Figure 1:
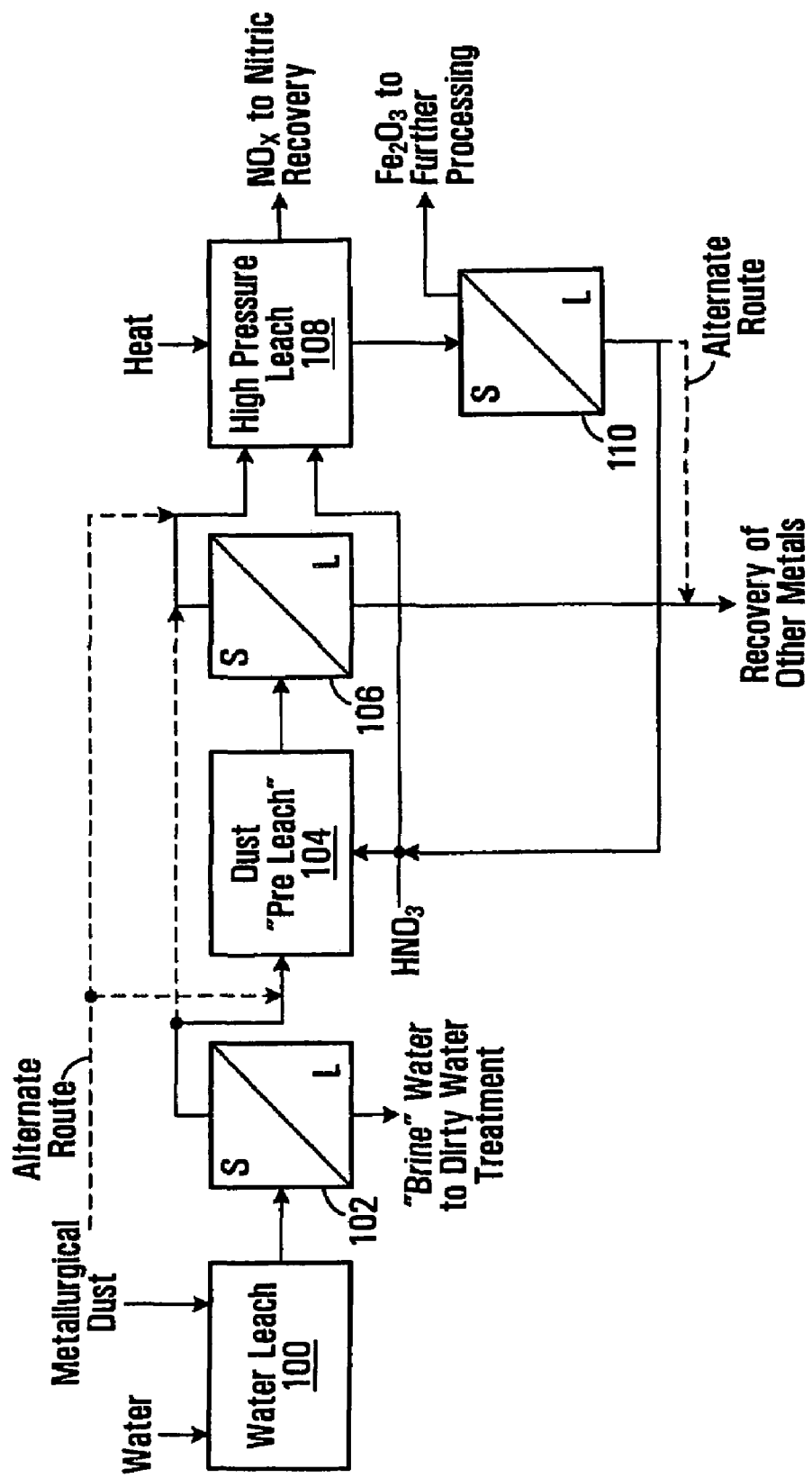
FIG. 1 is a flow chart of the process for treating a metallurgical composition, such as EAF dust, to produce a filtrate solution and a solid comprising ferric oxide.

As described herein, an improved process for the treatment of metallurgical dust involves the leaching of the metallurgical dust with nitric acid at elevated pressure conditions, and generally elevated temperature conditions, to dissolve one or more of the metal components of the dust while leaving a residue of ferric oxide. This process is built on the principle that at appropriate pressure and temperature conditions, iron forms solid iron oxide, specifically ferric oxide, in a nitric acid/nitrate solution. Since many of the other metal contaminants are solublized in nitric acid under the conditions at which ferric oxide is a precipitate, the ferric oxide can be separated from the other metal constituents. The high pressure leaching process can be repeated on the residue/precipitate from one pressurized leaching step to obtain a improved purity level of the ferric oxide. It has also been discovered that an initial low pressure leach can optionally be performed to initially process the dust to remove significant quantities of non-ferrous metals under pH conditions at which the iron remains in solid form. The high pressure leach approaches can be used to recover almost all of the iron from the original dust in very pure forms.

Metallurgic dust, as used herein, is any unpurified metal composition comprising a significant proportion of iron compositions. Suitable metal dust includes, for example, metallurgical dust from steel manufacturing processes, such as EAF dust, as well as iron scrap, iron rouge recovered from steel cleaning lines, mill scale, iron containing minerals and low grade iron based pigments. Since it is impure, the metallurgical dust generally comprises at least about 10 mole percent of non-ferrous metals prior to processing.

In the improved processes herein, the formation of ferric oxide solids releases the corresponding nitric acid that at ambient pressure conditions would form a ferric nitrate solution. Better separation of the non-ferrous metals from the ferric oxide is accomplished with excess nitric acid present during the high pressure leach. In some embodiments, the excess nitric acid can be directly recovered for reuse without evaporating water since the nitric acid in the filtrate solution can be diverted back into the leaching process, possibly with the addition of more acid. Alternatively, the filtrate can be diverted to recover other metal constituents in the solution. The high pressure leach processes described herein can be used to obtain very high purities of ferric oxide in an efficient process with materials that can be readily handled.

A high proportion of the zinc in EAF metallurgical dust is present in the form of ferrites ($ZnO.Fe_2O_3$), which have proven resistant to leaching processes. Some leaching techniques have used a two-stage leach under ambient temperature and pressure in order to obtain reasonably pure precipitate products and a nitric acid regeneration process from nitrates, such as the processes described in U.S. Pat. Nos. 5,912,402 and 6,264,909, which are incorporated herein by reference. When performing the processing under atmospheric pressure, a basic composition is added to precipitate ferric hydroxide.

In contrast, as described herein, techniques for reclaiming metal values from metallurgical dust perform the reaction of the metallurgical dust with nitric acid under pressurized conditions, to form ferric oxide from a metal nitrate solution. A leaching process under pressure produces a purified ferric oxide precipitate with sufficient amounts of other metals removed such that the resulting material is not toxic waste. Generally, all of the materials throughout the processing are straightforward to handle.

The improved process described herein can comprise an initial water wash of the metallurgical dust, thereby removing some of the chloride compounds and perhaps other contaminants contained in the dust. An optional, preliminary leach of the dust with nitric acid can be performed under atmospheric conditions, generally prior to performing a pressurized leach. The preliminary nitric acid leach is performed at a pH at which the iron is insoluble but many of the non-ferrous metals are somewhat soluble. Removal of the filtrate produces a solid residue at a first purification level.

The process material for the pressurized leach are solids, which can be unprocessed metallurgical dust or solids obtained following one or more initial purification steps, such as washing or acid leaching under atmospheric conditions. The process solid is reacted with nitric acid at enhanced pressure conditions, and generally enhanced temperature conditions. The acid can be added to the solids under pressurized conditions or at ambient conditions, although generally the pressure can be increased following the addition of the acid. Ferric oxide is formed in nitric acid under elevated pressure and temperature conditions. Thus, a significant amount of the iron in the solids can be collected as ferric oxide. On the other hand a significant proportion of the other metals are dissolved by the nitric acid into the solution at the elevated pressure conditions, Since many of the non-iron metals are dissolved, the recovered ferric oxide is significantly purified relative to the starting metallurgical waste. Thus, the processes described herein generally produce a ferric oxide solid product with contamination levels well below the present EPA toxic waste limits. Any $NO_x$ gas that is generated during this step can be collected and subsequently recycled into nitric acid. The pressurized leach step can be repeated one or more times to improve the purity of the ferric oxide. Specifically, by using the solid from one pressurized leach in a second pressurized leach, the remaining non-iron metal is dissolved into the solution during the subsequent processing step. In some embodiments, the ferric oxide that is generated can be sufficiently pure for a variety of uses including high value applications, such as in a pigment, in magnetic tape, in a polishing compound and in a variety of other uses.

Since the iron is not dissolved in the pressurized leach step once the pressure and temperature reach their target values, nitric acid is not consumed as ferric nitrate. Thus, less nitric acid is consumed in comparison with approaches that dissolve the iron in nitric acid and subsequently precipitate the iron from the solution by adjusting the pH. Generally, an excess of nitric acid is added in the pressurized leach steps. Thus, the filtrate from each acid leach may contain residual nitric acid. This residual nitric acid can be used by returning the filtrate, possibly with added nitric acid, to another acid leach step. Once a filtrate has excessive amounts of non-iron metals, the filtrate can be diverted to other processing steps to recover the other metals rather than to a leach step to use any excess acid. Also, different portions of the filtrate can be diverted to different uses. e.g., a portion can be recycled for its nitric acid content while another portion is diverted for recovery of non-ferrous metals.

The improved process for ferric oxide precipitation involves the use of a pressure vessel or autoclave that allows for reactions to occur at elevated temperatures and elevated pressures. Suitable pressure vessels for operating under appropriate high temperature and high pressure are available from various suppliers or can be constructed appropriately. For example, titanium reactors with an appropriate pressure capabilities can be used. The size of the pressure vessel can be scaled, for example, to handle the desired quantity of metallurgical dust to treat at a given time. The pressure vessel can be piped for the transfer of materials into and out of the vessel, or materials within other containers can be transferred into and out from the pressure vessel manually. In some embodiments, the vessel can be piped for the transfer of $NO_x$ gases to a nitric recycle process. The particular vessel that contacts the solutions generally have an interior surface that is designed to withstand contact with concentrated acids, such as nitric acid. Interior surfaces that may be suitable for such a pressure vessel include titanium, ceramic, glass and the like. The vessel may or may not provide for agitation of the materials during processing.

In general, the metallurgical dust treatment can be performed in the vicinity of an EAF facility, a BOF facility or other dust generating facility, or the dust can be transported to a central recovery facility. If the reclamation process described herein is practiced near an individual dust producing locations, the transportation of hazardous waste and the potential liabilities associated with the shipment of hazardous and noxious wastes can be reduced or eliminated. In addition, the need for storage of such hazardous waste can be reduced and potentially eliminated.

The improved method of treating metallurgical dust and recovering used chemicals described herein is based on the differential solubilities of metal compounds in a nitric acid solution under elevated temperatures and pressure. In particular, insoluble ferric oxide forms at high pressures in an aqueous nitric acid/metal nitrate solution. For example, iron nitrate hydrolyzes and precipitates at elevated temperature and pressures. The reaction for the formation of ferric oxide is as follows:

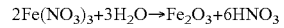

$$2Fe(NO_3)_3 + 3H_2O \rightarrow Fe_2O_3 + 6HNO_3$$

In the present reaction, we do not need to consider whether or not iron nitrate is a formal intermediate in the process, but the end result of the processing is that ferric oxide is formed. Thus, the process comprises reacting the metallurgical dust or a partly purified form thereof with a solution of nitric acid under enhanced temperature and pressure, which can result in the complete or nearly complete dissolution of the non-iron metal compositions, such as zinc, manganese, cadmium and lead compositions, that are present in the metallurgical dust. Filtering of the solid results in the separation of the solid ferric oxide from the filtrate, which generally contains dissolved non-ferrous metals. Other metal values can then be recovered from the filtrate by further processing, and any unreacted nitric acid in the filtrate can be reused, if desired.

The reclamation process is summarized in FIG. 1. The reclamation process can include an optional step of washing 100 the metallurgical dust with water. The washed dust is filtered 102 to separate the residual solid from the wash water. The process also optionally includes a preliminary leach or pre-leach 104 with nitric acid that is performed at ambient pressure. The pre-leach slurry is filtered 106 with the residue solids diverted for additional leaching and the filtrate liquid being diverted for further processing to recover non-ferrous metals. Additional preliminary treatments can also be performed, if desired. The residue from the one or more preliminary treatments is subjected to a pressurized nitric acid leach 108. The slurry from the nitric acid leach is filtered 110. The solids from the pressurized nitric acid leach are purified ferric oxide that are used in the purified form or optionally subjected to an additional pressurized leach to further purify the material, as described further below. The filtrates from the various leach steps can be diverted to reuse residual nitric acid or to further processing for the recovery of non-ferrous metal components. The further processing of the filtrates is described further below. Also, the residue solids can be subjected to one or more additional pressurized leach steps, as described further below. Each of the steps individually or groups of steps collectively can be performed in batch mode or alternatively in continuous operation.

In some embodiments, it can be beneficial to perform this initial step of washing 100 the metallurgical dust with water prior to the addition of nitric acid. In particular, the water wash can remove undesirable metal halides and other soluble compositions from the solids such that they are not present in later processing steps. In general, sufficient water can be added to the metallic waste to remove the desired compounds. Generally, mixture is stirred to facilitate the solubilization process. This wash can be performed in any reasonable vessel.

The water wash mixture can be subjected to solid-liquid separation 102 to separate a washed metallurgical dust residue from the filtrate solution. Separation process 102 can be performed by pressure filtration, vacuum filtration, gravity filtration as well as decanting the liquid from the solid, optionally after centrifugation. For filtration approaches, standard commercial filter media can be used, such as polymer woven cloth filter media, paper filter media, porous ceramic filter media, and the like. Regardless of the separation approach, for convenience the separated liquid is referred to as the filtrate, and the separated solids are referred to as the precipitate. The filtrate then can be sent to a water treatment system for processing. The residue solids can be further processed in an acid leach, which can be a pre-leach 104 or directly a pressurized acid leach 108.

Either washed or unwashed metallurgical dust can be optionally reacted, i.e., leached, 104 with a nitric acid solution at atmospheric pressure. Sufficient nitric acid generally is added to lower the pH to values in which significant quantities of non-ferrous metals are dissolved into the acid solution without dissolving a significant quantity of the iron compounds. The pH can be adjusted to be between about 0.25 and about 2.5, in other embodiments from about 0.35 to about 2.0, and in further embodiments from about 0.5 to about 1.5. The amount of iron that remains in the solid residue generally is at least about 95 weight percent, in further embodiments at least about 97 weight percent, and in additional embodiments at least about 99 weight percent. A person of ordinary skill in the art will recognize that additional ranges of pH and iron content are contemplated and are within the present disclosure.

In principle, one or more additional preprocessing steps can be performed to prepare the solid metal waste prior to performing the high pressure acid leach step. Similarly, the optional water leach and/or the pre-leach may or may not be performed. However, the selected solid is then subjected to a high pressure nitric acid leach step 108. Generally, the materials are also subjected to elevated temperatures during this step. During this step, a mixture is formed as a paste or slurry from the nitric acid solution and the metal dust waste. The water and/or acid may or may not be added at the high pressure and temperature conditions to achieve the desired results. Furthermore, a portion of the water and/or acid can be added at ambient pressure and an additional portion can be added at an elevated pressure. The order of performing this step may depend on the selected apparatus to perform the processing since it may be more or less difficult to add materials into the pressurized container. The mixture can be stirred to facilitate the solubilization of the non-ferrous metals.

The amount of nitric acid added is a function of the concentration of the acid and the volume of acid solution. While in principle pure nitric acid can be used, it can be difficult to handle and expensive to use undiluted nitric acid. In general, the metallurgical dust is reacted with a nitric acid solution having a concentration in the ranges from about a 10 weight percent to about a 75 weight percent nitric acid solution, in some embodiments, from about 20 weight percent to about 70 weight percent, and in further embodiments, from about 25 weight percent to about 65 weigh percent nitric acid solution. The nitric acid can be supplied from a nitric acid supply, which may comprise recycled nitric acid and/or a fresh supply of nitric acid. With respect to relative quantities on compositions, relative weights of nitric acid and metal waste generally depends on the concentration of the nitric acid solution. Also, if a more concentrated nitric acid solution is added to form the pulp, additional water may also be added. For more dilute nitric acid solutions, a weight ratio of nitric acid to the metallurgical dust may be, for example, a ratio of about three-to-1 (3:1) or greater by weight acid solution to dry metallurgical dust. In other embodiments with a higher acid concentration, a weight ratio may be used of one-to-one (1:1) or less of acid solution to dry metallurgical dust. In general, the desired amount of acid added may also depend on the composition of the metal dust. The amount of acid can be evaluated by examining the acid in the resulting mixture. The concentration of acid in the resulting mixture can be selected to yield the desired solubilization of the non-ferrous metals into the filtrate solution. Acceptable leaching can be accomplished with no free acid in the mixture. However, generally higher purity ferric oxide is obtained when the mixture contains free nitric acid. The concentration of free nitric acid can be at least 5 grams/liter (g/L), and in some embodiments at least about 15 g/L, in further embodiments at least about 30 g/L and in additional embodiments at least about 50 g/L. Although the free acid can be measured at various times in the solubilization process at elevated pressures, these values can be considered the equilibrium values after a sufficient period of time that the concentration no longer changes significantly. A person of ordinary skill in the art will recognize that additional ranges of reactant acid concentrations, weight ratios of acid to solid quantities and free acid concentration within the explicit ratios above are contemplated and are within the present disclosure.

The amount of acid added can involve trade-offs with respect to cost and results. The addition of more acid increases the cost for the acid, but the addition of more acid can result in better solubilization of the non-iron metals. Better solubilization of the non-iron metals results in a more pure ferric oxide product. In particular, to obtain the more complete dissolving of lead and zinc, the presence of free nitric acid may be desirable during and following the nitric acid leach 108. If lower amounts of nitric acid are used, undissolved ferrites may remain in the solids. However, multiple nitric acid leaches may be performed to dissolve the non-iron metals, whether or not in the form of ferrites, and to recover purer precipitates of ferric oxide.

The high pressure nitric acid leach process can involve one or more steps within the process. For example, to perform the high pressure leach, the metallurgical dust and the nitric acid can be combined at ambient temperature and pressure to form a slurry or pulp. The mixture can be performed in a pressure vessel, or the mixture can be formed in another vessel and subsequently transferred to the pressure vessel for performing the high pressure leach. In some embodiments, the metallurgical dust and nitric acid can be combined at elevated temperature and/or pressure, for example the temperature and pressure used to precipitate the ferric oxide.

In a particular embodiment, the nitric acid and metal dust generally is mixed initially at ambient pressures. This mixing may or may not take place within the pressure vessel. If the mixing is initially performed outside of the pressure vessel, the mixture is transported into the pressure vessel. The pressure can be increased by closing the pressure vessel and increasing the temperature. Steam can be injected to effectuate the increase in both the temperature and the pressure. Alternatively or additionally, the reactor can be heated with a heating mantle or the like and/or the slurry can be heated during the transfer into the reactor vessel.

Upon forming the combination of dust and acid, the mixture can be mixed at ambient pressure in some embodiments for at least about one quarter hour and in further embodiments from about half an hour to about five hours and in further embodiments from about one hour to about two hours. Also, the reaction time under elevated pressure should be selected to achieve the desired solubilization of the nonferrous metals into the nitric acid solution. In general, after a sufficient period of time, the mixture reaches equilibrium such that the composition does not change significantly with the passage of additional time. In the examples below, the composition generally stopped changing after about 2 to about 2½ hours. Generally, the Leach within the selected pressure and temperature ranges is performed for at least about 30 minutes, in additional embodiments for at least about one hour, in further embodiments for at least about two hours, and in other embodiments from about 2½ hours to about 5 hours. A person of ordinary skill in the art will recognize that additional reaction times within the explicit ranges of reaction time are contemplated and are within the present disclosure. Mechanical impellers or other mixing apparatuses can be used to mix the slurry.

In addition, the elevated temperatures and pressures used during the high pressure nitric acid leach 108 step increase the dissolution of the zinc, lead and other non-ferrous metals. The pressure and temperature may also influence the rates of dissolution. Over appropriate ranges of the elevated temperatures and pressures of the nitric acid solution in the pressure vessel, ferric oxide is almost completely insoluble such that almost all of the iron is recovered as ferric oxide. Thus, the ferric oxide can be separated from the non-iron metals that remain in solution. Impurities can result, for example, from solid ferrites that maintain non-iron metals within the solids. In some embodiments, the high pressure leach reaction generally takes place at temperatures in the range of at least about 150° C., in further embodiments from about 200° C. to about 500° C., in other embodiments from about 225° C. to about 400° C., and in further embodiments from about 250° C. to about 350° C. In addition, the pressure of the pressure vessel generally can be maintained at a value of at least about 225 psig, in further embodiments from about 250 psig to about 800 psig, in other embodiments from about 275 to about 600 psig, and in some embodiments from about 300 psig to about 500 psig. The psig (pounds per square inch gauge) is a measure of pressure such that the stated value is the amount above atmospheric pressure. For batch processing, the above values may be average values potentially following a transient period in which the temperature and pressure ramp up to near the average processing conditions. A person of ordinary skill in the art will recognize that additional ranges of temperature and pressure within the explicit ranges are contemplated and are within the present disclosure.

The high pressure nitric acid leach step 108 can generate gas, $NO_x$ which can be vented for transportation to a location for collection and recovery of nitric by combining the gas with water. The venting of any nitric oxide gases should be performed with due regard for maintaining the pressure in the pressure vessel at desired levels. Similarly, the collected nitric oxide gases can be isolated from the pressure vessel for recovery, for example using conventional pressure valves. The nitric gases represented by $NO_x$ can be converted into nitric acid for reuse, for example, following to procedure described in U.S. Pat. No. 6,264,909 to Drinkard, Jr., entitled "Nitric Acid Production And Recycle," incorporated herein by reference.

The residual solid comprising mostly ferric oxide is separated 110 from the filtrate. In addition, the residual solid can be washed to remove solubilized non-ferrous metals that stick to the solids during the separation step. In general, the washing can be performed in any reasonable approach. In one embodiment, one or more washing steps are used in which each washing step involved suspending the solids in water and filtering the solids. Enough water can be used to perform the suspension in each step. The wash steps can be repeated until the wash water has a desired level of purity. The wash water can be added to the initial filtrate, separately processed to remove the metal components or otherwise treated for disposal.

The filtrate from the high pressure leach generally has free nitric acid as well as significant quantities of solubilized non-ferrous metals. This solution can be alternatively returned to perform additional leach steps at ambient pressure or at elevated pressures to make use of the free nitric acid. Additional nitric acid can be added from a nitric acid supply to obtain the desired levels of acid for the leach. Additionally or alternatively, a portion or all of the filtrate can be directed to further processing to reclaim the non-ferrous metals from the solution, as described further below. FIG. 1 shows the alternative processing pathways for the filtrate solution.

Figure 2:
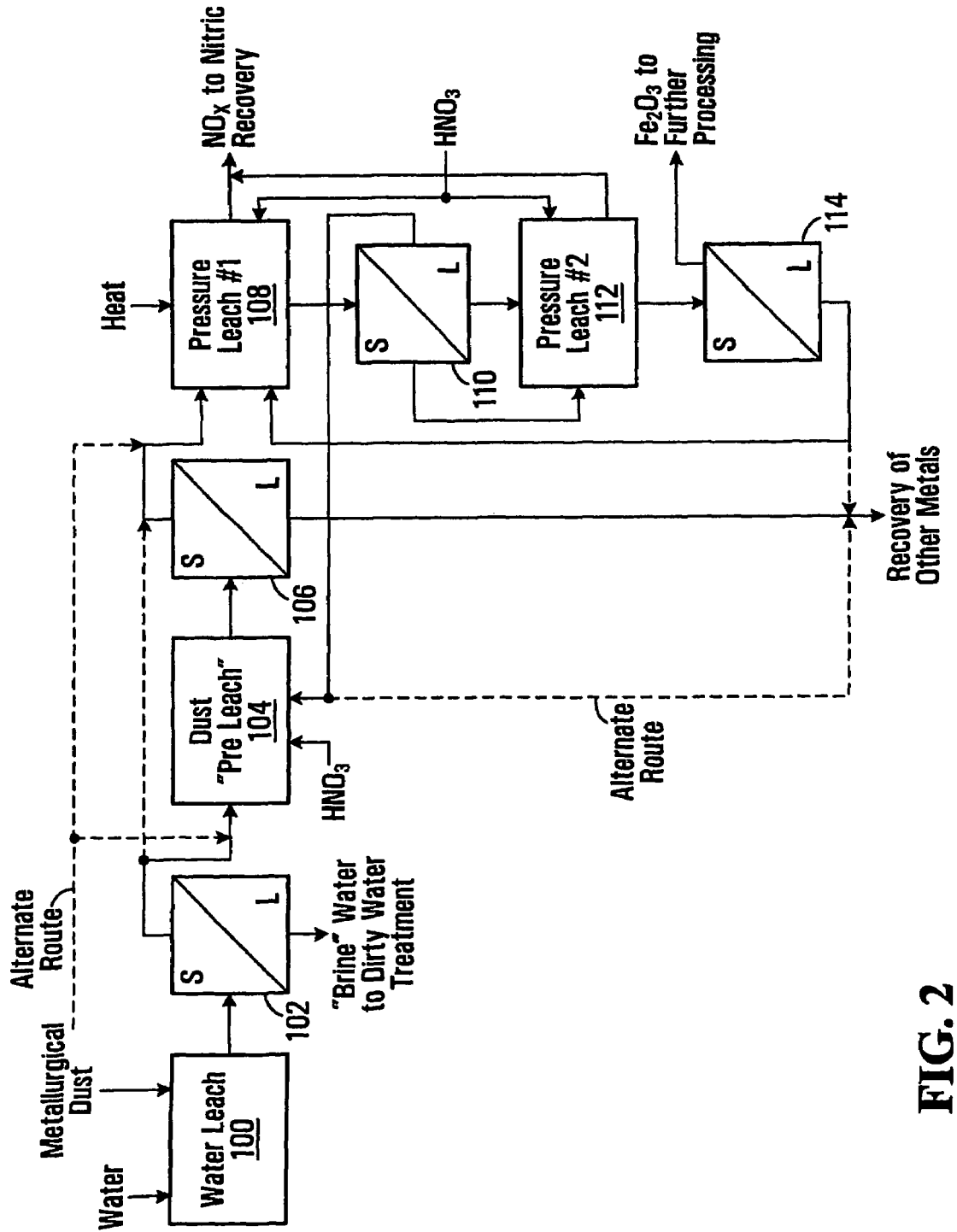
FIG. 2 is an expanded flow chart of FIG. 1, which adds a second leaching step to the process of obtaining ferric oxide.

FIG. 2 expands upon the improved reclamation process shown in FIG. 1 by showing the addition of another pressurized nitric acid leaching step 112, in which the ferric oxide solids from the first pressurized nitric acid leaching step are contacted with additional nitric acid and subjected to elevated pressures, generally with the addition of heat. In the additional leaching step 112, nitric acid can be added to the ferric oxide precipitate either under elevated pressure or added at ambient pressure and subsequently reacted under pressure. The additional nitric acid leaching step 112 generally is conducted similarly to the initial nitric acid leaching step 108 described above. Generally, pressurized nitric acid leach is conducted with free nitric acid present. The free nitric acid levels can be comparable to those levels described above for leaching step 108. Since the products have already been purified, lower amounts of acid may be needed for pressurized leach 112. Additional ferrites may be dissolved in this second leach, resulting in a purer ferric oxide product. Any $NO_x$ gases produced at this stage can be recycled according to the nitric acid recovery.

After sufficient time has passed, the materials from the second pressurized leach are subjected to filtration 114. The solids can also be washed with various amounts of water, as described above with respect to filtration step 110. The solids/precipitate from the filtration are purified ferric oxide. The filtrate from this second leach may or may not be combined with the filtrate from an earlier leach step, and the individual or combined filtrates can be reused, optionally with the addition of further nitric acid, in another leach step or further processed for recovery of non-ferrous metals. Portions of the filtrate can be processed differently, as desired. One or more additional pressurized leach steps can also be performed to further increase the purity of the ferric oxide solid product.

Using one, two or more pressurized leach steps, the resulting ferric oxide can have many metal contaminant levels reduced to values as low as desired. With two pressurized processing steps, it is possible to obtain ferric oxide without most of the non-ferrous metals. Chromium evidently is very difficult to separate from the ferric oxide and co-precipitates with the ferric oxide. But the other heavy metals generally are removed in the pressurized nitric acid leach to purify the ferric oxide. Pure ferric oxide ($Fe_2O_3$) has 69.94 weight percent iron and 30.06 weight percent oxygen.

The differential solubilities are sufficient that at least about 95 percent, in some embodiments at least about 97.5% and in further embodiments at least about 99% of the initial iron in the metallurgical waste fed into the pressurized nitric acid leach can be recovered as purified ferric oxide. In general, it is possible to obtain a solid product with at least about 70 weight percent, in further embodiments at least about 80 weight percent ferric oxide and in other embodiments from about 85 to about 95 weight percent ferric oxide. In some purified ferric oxide materials, a majority of the remaining impurities comprise silicates. At the same time, it is possible to reduce zinc levels to very low values, such as levels of no more than about 5% of the initial zinc. Specifically, zinc metal concentrations in the ferric oxide solids can be reduced to values no more than about 10 weight percent, in further embodiments no more than about 2 weight percent. In other embodiments no more than about 0.5 weight percent and in additional embodiments no more than about 0.1 weight percent. A person of ordinary skill in the art will recognize that additional ranges of compositions within the explicit ranges are contemplated and are within the present disclosure.

Similarly, lead, cadmium and manganese can be reduced to low concentrations. In particular, toxic lead levels can be reduced to no more than about 0.1 weight percent, in other embodiments no more than about 0.05 weight percent and in further embodiments no more than about 0.04 weight percent. Other metal levels, such as arsenic, cadmium, manganese, can be similarly reduced. A person of ordinary skill in the art will recognize that additional ranges of concentrations are contemplated and are within the present disclosure. Since the heavy metal concentrations can be reduced significantly in the purified ferric oxide solids, there are many options for handling the solid product, including disposing of the solid as regular waste, directing the product back into the steel making operation or using the product in higher value uses, such as for pigments. For use as pigments, the purified ferric oxide can be incorporated, for example, into a coating composition by combining the ferric oxide with a suitable carrier liquid. Alternatively or additionally, the purified ferric oxide can be combined with a molding composition for molding into a solid object incorporating the ferric oxide as a pigment. The molding composition can comprise, for example, a polymer or concrete. The forming of the solid object can be based on any of a variety of approaches including, for example, any of various molding approaches, extrusion approaches, and the like.

A significant result of the process is that the product dust may no longer be classified as toxic waste under current standards of the Environmental Protection Agency (EPA) under the Toxicity Characteristic Leach Procedure based Toxicity Characteristic metal waste limits for land fills as found presently in the Code of Federal Regulations. 40 C.F.R. § 261.24 (Toxicity Characteristics), incorporated herein by reference. In particular, it has been demonstrated that sufficient amounts of heavy metals can be removed with a single pressurized nitric acid leach, as described herein, that the resulting solids are no longer toxic waste under 2004 EPA solid waste standards, incorporated herein by reference. Specifically, sufficient amounts of arsenic, barium, chromium, mercury, nickel and lead are removed. The ability to treat the dust to form a solid that is not hazardous waste is an important result of the process. Of course, with appropriate processing, the processes described herein can further improve the purity of the resulting ferric oxide not only to have a material that is not hazardous waste, but that is suitable for desired uses such as pigments. In particular, crystalline ferric oxide can be produced from the processes described herein that have desirable characteristics for a variety of uses, such as pigments, which further benefit from the crystallinity of the purified ferric oxide. Substantial crystallinity can be verified using x-ray diffraction analysis of the product materials.

The filtrate following removal of ferric oxide comprises nitric acid and dissolved non-ferrous metal compounds, although some residual iron remains in the solution, which is a non-trivial amount even if only a small fraction of the original iron in the dust. Generally, a significant fraction of the remaining metal is zinc. The remaining metals can be recovered to produce useful materials.

Additional metals can be reclaimed from the metal nitrate filtrate solution. In one pathway, the filtrate, F, from the iron recovery is evaporated 140, generally by applying heat, to concentrate the solution. Generally, most of the non-zinc metals precipitate prior to the zinc nitrate. Therefore, the concentrate can be collected and used for further processing to recover other metals. Alternatively or additionally, the solution can be evaporated to dryness and decomposed to produce metal oxides, oxygen and nitrogen oxide gases ($NO_x$) which can be recovered and added to water to form nitric acid. The metal oxides can be further processed to recover desired metals. Approaches for the recovery of non-ferrous metals is described further in U.S. Pat. No. 5,912,402 to Drinkard, Jr., et al., entitled "Metallurgical Dust Recycle Process," incorporated herein by reference.

Apparatus

Figure 3:
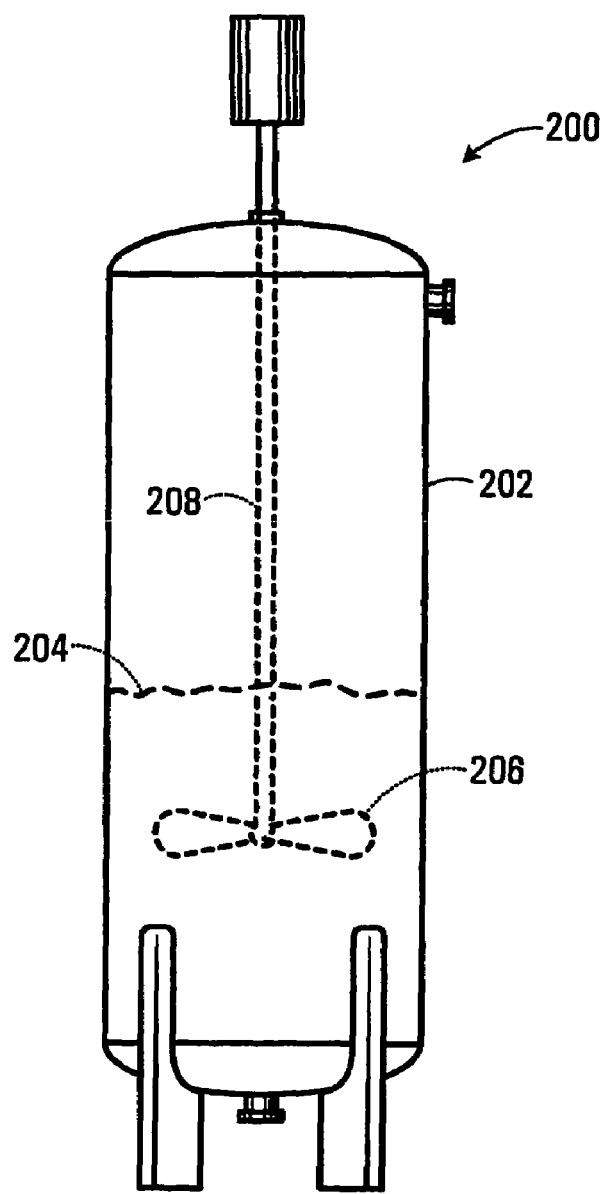
FIG. 3 is schematic diagram depicting an apparatus to conduct a nitric acid leach of a metallurgical composition under pressure.

Generally, the various steps of the metal recovery process can be performed with commercially available reactors and vessels. The pressurized nitric acid leach steps combine various reactants and equipment to accomplish the ferric oxide purification. An embodiment of an apparatus for performing the pressurized nitric acid leach for treating metallurgical dust can comprise metallurgical dust and aqueous nitric acid in a sealed reaction vessel capable of withstanding the pressures reached during the process. The vessels used for at some of the other steps of the reclamation process do not necessarily have to be pressure vessels The metallurgical dust can be supplied from an Electric Arc Furnace (EAF), a Basic Oxygen Furnace (BOF) or some other process that produces waste metallurgical dust. The water used in the apparatus to wash the metallurgical dust can be city water, deionized water, some other processed water or a combination thereof Referring to FIG. 3, a schematic diagram shows a reactor suitable for performing the pressurized nitric acid leach. Reaction system 200 comprises a pressure vessel/reactor 202, a paste or pulp 204 of the aqueous nitric acid and metallurgical dust, a heating element 206, and an impeller 208 for stirring the reaction mixture/pulp. Suitable reaction systems can be adapted from commercial reactors or can be constructed from readily available materials. For example, suitable reactors include, for example, pressure reactors available from Parr Instrument Co., Moline, Ill.

The nitric acid solution can be provided from a nitric acid supply, which can be provided from commercial sources, the nitric acid recycle system which recovers nitrogen oxide gases that are hydrated to form nitric acid, filtrate solutions from a leach step that has free nitric acid, or a combination thereof.

Seeded Precipitation Process

Figure 7:
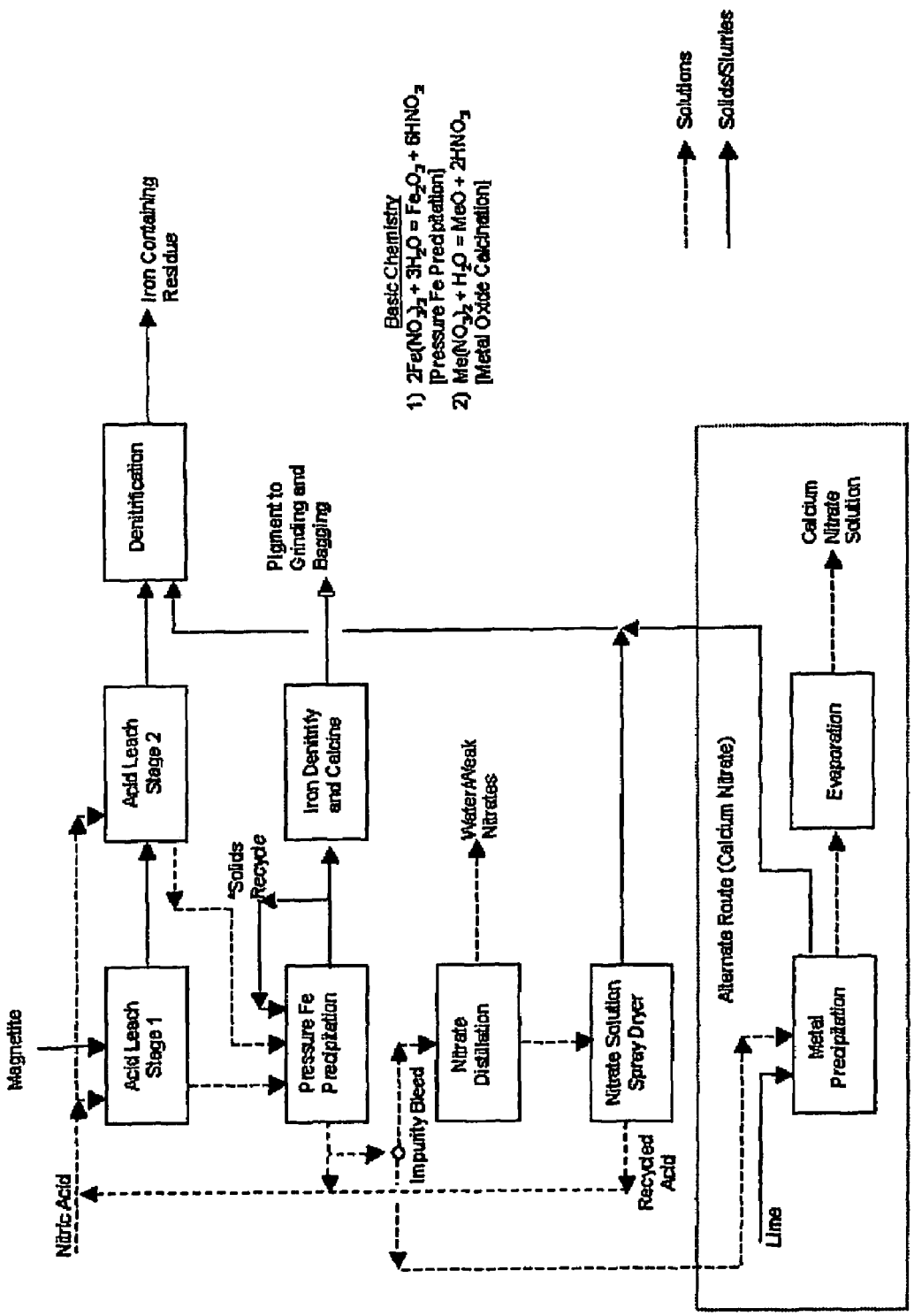
FIG. 7 is a process flow diagram for the seeded precipitation process.

In one embodiment of the seeded precipitation process as illustrated in FIG. 7, iron is dissolved in acid to form an iron salt solution in the acid leach stage. Suitable acids include nitric acid, sulfuric acid and hydrochloric acid. Iron can be solubilized and precipitated from ferric sulphate salt or iron chloride solutions. For example, see "Formation of Pure Hematite by Hydrolysis of Iron (III) Salt Solutions under Hydrothermal Conditions", B. Voigt and A. Gobler in, Crystal Research Technology, Vol. 21, 1986, pp.1177-1183). Seed solids are added to the pressure iron precipitation stage, and the mixture is subjected to elevated temperature and pressure for a time sufficient to obtain precipitates of selected particle sizes.

In another embodiment, iron solids, such as magnetite, are combined with an acid, for example nitric acid, and leached in stirred reactors to solubilize the iron and form an iron salt solution (400). The exact leach stage arrangement will depend on the characteristics of the iron solids that are used. The leach may be performed in a single stage or in multiple stages arranged in "series" or "parallel". Recycling of partially leached solids from the leach stage product stream back to the feed end of the leach stage may be of benefit to increase iron solubilizations.

In various embodiments, there is provided the use of magnetite as the iron seed solid in combination with the feed solution for the acid leach. Acid leaching could also be accomplished using other iron-containing seed solids. These may include scrap irons and other materials such as metallurgical wastes or mine concentrates. For example, waste solutions from the pickling of steel products. Optionally iron salt solutions of nitrates, sulphates and chlorides can also be used. Depending on the seed solids utilized, the exact leach circuit arrangement may be modified accordingly.

A certain portion of insoluble material may be contained in the seed solids. After acid leaching (400), the iron salt solution may be subjected to a liquid/solids separation stage. This can be accomplished using a number of conventional techniques including filtration (vacuum and pressure), sedimentation or a combination of both techniques. Any insoluble solids can be processed in a high temperature denitrification stage (401) to remove residual moisture and nitrates. The temperatures required for denitrification will depend on the level of residual nitrates that are acceptable and generally range from about 400° C. up to about 700° C. Moisture and nitrate gases removed during (401) can be recovered for reuse using conventional condensation and scrubbing technologies.

The iron salt solution from the leach stage (400) may then be utilized as the feed solution for the pressure iron precipitation stage (402). Prior to precipitation, iron oxide seed solids may be combined with the iron salt feed solution, in a mixed vessel, to form a feed solution/seed solid slurry. The quantity of seed solid utilized and/or seeding ratio can be adjusted in order to control the particle size of the precipitated iron oxides in the product slurry. The seeding ratio refers to the ratio of the weight of the seed solid to the weight of iron oxide precipitate that would be expected to be obtained from an unseeded pressure precipitation reaction under selected precipitation conditions with a known feed solution. The seeding ratio is calculated based on the weight of precipitate product from a trial unseeded pressure precipitation reaction. For example, one would conduct an unseeded pressure precipitation reaction using a known volume of feed solution having a known concentration of dissolved iron, at a given temperature and pressure and weigh the resulting ferric oxide precipitate of the reaction to determine the efficiency of precipitation, i.e. the proportion of dissolved iron that is precipitated under these selected unseeded conditions. Based on the weight of the product, a selected seeding ratio can then be selected for subsequent seeded pressure precipitation reactions. The seeding ratio may, for example range from about 20% to about 2000% of the new iron oxides that will be precipitated. In another embodiment, the seeded precipitation process may be carried out using a seeding ratio of from about 50% to about 500%. Alternatively, all or a portion of the seed material can be injected directly into the pressure precipitation reactor during the precipitation process. In another embodiment, the seed solids can be ground to pigment grade size of approximately less than or equal to 2 microns, prior to being added to the pressure precipitation stage to improve the control of the precipitated product particle size.

In alternative embodiments, the seeded precipitation process may be carried out using a seeding ratio in the range selected from any minimum value of from about 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000% to any higher maximum value of about 1000, 1100, 1200, 1300, 1400, 1500, 1600, 1700, 1800, 1900, or 2000%.

In various embodiments, the pressure iron precipitation stage (402) can be performed in either a batch-wise or continuous manner. In various embodiments, a stirred pressure precipitation reactor is utilized to maintain the seed solids in suspension during the precipitation process. In another embodiment, using a continuously operating precipitation process, the reactor may be constructed with internal weirs to divide the vessel into a number of compartments in series, with each compartment agitated individually. Alternatively, any number of individually agitated vessels could be arranged in series. One skilled in the art would appreciate that other reactor arrangements are also contemplated to achieve the continuous precipitation process.

In various embodiments, the iron salt feed solution/seed solid slurry can be heated prior to entering the precipitation reactor and/or while the precipitations are taking place. Heating can be accomplished either directly or indirectly. In some embodiments, heat may be recovered from the precipitation product slurry (402) and used to heat the next feed/seed slurry. The extent of iron precipitation may be dependent on the temperature utilized during precipitation and the concentration of iron and free acid in the feed slurry. As the concentration of dissolved iron and free acid are increased, the temperature required to obtain the same level of precipitation is also increased. In one embodiment, conventional process vessel design economics typically dictate temperatures of from about 100° C. to about 300° C. with the feed/seed slurry containing anywhere from about 5 g/l of dissolved iron up to the onset of crystalization of the ferric salt. A similar amount of free acid could also be used in some embodiments. These conditions would require pressures of from above atmospheric pressure to about 1300 psig. Other reactor vessel designs may allow for higher concentrations of iron and free acid and correspondingly higher temperatures to be utilized. In general, the seeded process is a rapid reaction. The precipitation reactions proceed to completion quite rapidly, in some cases requiring retention times of less than 1 hour. Higher precipitation temperatures may reduce the reaction time in some embodiments. In various embodiments, the seeded precipitation process may have retention times from about one minute to about six hours. In various embodiments, the seeded precipitation process may have retention times from about thirty minutes to about one hour.

In alternative embodiments, the seeded precipitation process may have retention times selected from any minimum value of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 minutes to any higher maximum time of about 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, or 360 minutes.

In various embodiments, the seeded precipitation process may utilize temperatures from about 100° C. to about 300° C. In other embodiments, temperatures of from about 175° C. to about 250° C. may be utilized. In other embodiments, lower temperatures of from about 130° C. to about 175° C. can be used, especially if solutions having a lower iron concentrations are used. In alternative embodiments, the seeded precipitation process may be carried out at a temperature, or temperature range selected from any minimum value of about 100, 105, 110, 115, 120, 125, 130, 135, 140, 145, 150, 155, 160, 165, 170, or 175° C., to any higher maximum value of about 175, 180, 185, 190, 195, 200, 205, 210, 215, 220, 225, 230, 235, 240,245, 250, 255, 260, 265, 270, 275, 280, 285, 290, 295, or 300° C. In various embodiments, the pressures associated with temperature ranges of from 175° C. to 250° C. are from about 100 psig to about 600 psig.

In alternative embodiments, the seeded precipitation process may be carried out at a pressure, or pressure range selected from any minimum value of about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or 300 psig, to any higher maximum value of about 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1120, 1130, 1140, 1150, 1160, 1170, 1180, 1190, 1200, 1210, 1220, 1230, 1240, 1250, 1260, 1270, 1280, 1290, or 1300 psig.

In other embodiments, temperatures can be modulated to control particle size and appearance. For example, higher temperatures generally result in larger particles with smoother surface textures while lower temperatures may produce particles with rougher surfaces. In some embodiments, lower temperatures at a given seeding ratio may result in smaller particles than a correspondingly higher temperature.

In various embodiments, after the pressure precipitation stage (402), the product slurry may be discharged from the reactor where it may be cooled and returned to atmospheric pressure. Cooling can occur via indirect means, direct injection or steam flashing as the pressure is relieved. The product slurry stream may then be subjected to a solid/liquid separation process. This can be accomplished using a number of convention techniques including filtration (vacuum and pressure), sedimentation or a combination of both techniques. In another embodiment, a portion of the precipitated solids may be diverted and recycled as seed solids for the pressure precipitation. In another embodiment, the final product solids may be denitrified/calcined (403) to remove any residual water and nitrates. The temperatures required for denitrification will depend on the level of residual nitrates that are acceptable. Temperatures for denitrification/calcination may generally be in excess of from about 400° C. up to about 700° C. Moisture and nitrate gases removed during this stage (403) may be recovered for reuse using conventional condensation and scrubbing technologies. In another embodiment, the dried solids may then be processed conventionally as pigment material.

During the pressure precipitation process, the iron in solution may be hydrolyzed to form ferric oxide solids. In one embodiment, the acid component of the species may be recovered or regenerated in solution, for example, in the form of nitric acid. Following liquid/solid separation, the majority of this solution may be recycled to the acid leach stage (400) in order to produce new ferric nitrate solution for further pigment production. In some embodiments, the bleed stream may be utilized to remove a portion of the regenerated acid solution. The purpose of this bleed to maintain acceptable levels of other non-ferrous minor impurities that may be solubilized in the acid leach stage (400). The ratio of bleed volume to recycled solution volume may be dependent on the quantities of these impurities in solution. Impurities depend on the source of iron feed material being utilized and may typically include elements such as manganese, aluminum, calcium, magnesium, sodium, etc.

In various embodiments there are several potential treatment processes available for the nitrate solution bleed stream. In one embodiment, the stream may be subjected to a distillation process (404) to concentrate the acid and soluble metal nitrates by removing an overhead stream of water/weak nitrates. The distillation bottoms may then be subjected to a direct spray drying process (405) which flashes off the majority of the nitric acid and water leaving a solid product of metal oxides with some residual nitrates and moisture. The spray dryer overheads may be treated via condensation and scrubbers to recover the nitric acid which may then be recycled to the acid leach stage (400) of the process. In another embodiment, the solids from the spray drying process may be further treated to remove the residual nitrates/moisture by denitrification (401).

Alternatively in another embodiment, the nitrate bleed stream may be treated via alkaline (i.e. lime) precipitation to precipitate the majority of the metallic impurities (406). The slurry from the precipitation may be processed via solid/liquid separation to remove the precipitated solids which may then be subjected to a denitrification stage (401) to eliminate residual nitrates and moisture. The solution (filtrate) from the solid/liquid separation may be concentrated via evaporation (407) to produce a commercial grade calcium nitrate solution that can be sold. Depending on the choice of alkaline for the precipitation, different final product solutions can be prepared. The choice of processing solution for the nitrate bleed solution will depend on a number of project-specific parameters. The goal of the treatments is to recover value for the contained nitrates and produce products that have economic value.

In various embodiments, both the seeding ratio and temperature may be modified to tailor the characteristics of the particle obtained by precipitation. Modifications of the seeding ratio and temperature results in the production of a wide range of pigment colours and sizes. For example, red shades from "yellow-shade" reds (fine particles) to "blue-shade" reds (coarser particles) can be obtained. The seeded precipitation process allows control of the size and colour of the precipitates directly when the particles are being formed. In another embodiment, if additional modifications are required, the precipitates can be processed conventionally by subsequent calcination and/or milling.

In various embodiments, the precipitates obtained by the seeded precipitation process have average particle size diameters of from about 0.1 microns up to about 10 microns. In various embodiments, the precipitates obtained by the seeded precipitation process have particle size diameters of from about 0.15 microns up to about 2.5 microns. In alternative embodiments, the average particle size diameters ($d_{50}$) of the particles of ferric oxide precipitates obtained by the seeded precipitation process are selected from any minimum value of about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 microns, to any higher maximum value of about 2.5, 2.6, 2.7, 2.8, 2.9, 3.0, 3.1, 3.2, 3.3, 3.4, 3.5, 3.6, 3.7, 3.8, 3.9, 4.0, 4.5, 5.0, 5.5, 6.0, 6.5, 7.0, 7.5, 8.0, 8.5, 9.0, 9.5, or 10 microns.

In various embodiments, to obtain a salt solution of dissolved iron, magnetite may be dissolved in nitric acid. In another embodiment, iron solids such as hematite or waste pickling steel products can be used with the claimed process. In another embodiment, salts other than ferric nitrates can be used, for example sulphates and chlorides can also be employed.

In another embodiment, the dissolved iron concentration in the salt solution can range from about 5 g/L up to the onset of crystallization of the ferric salt. In another embodiment, the dissolved iron concentration in the salt solution can range from about 10 g/L to about 100 g/L. In another embodiment, the dissolved iron concentration in the salt solution can range from about 30 g/L to about 60 g/L. In alternative embodiments, the dissolved iron concentration is selected from any minimum value of about 5, 10 15, 20, or 30 g/L, to any maximum value of about 30, 40, 50, 60, 70, 80, 90, 100 g/L or up to the onset of crystallization.

In one embodiment, the concentration of free acid in the iron salt solution can range from about 0 to about 150 g/L. In one embodiment, the concentration of free acid in the iron salt solution can range from about 30 to about 70 g/L. One skilled in the art will appreciate that higher free acid concentrations can be used but would require specialized reactor vessels able to tolerate higher pressures. In alternative embodiments, the free acid concentration is selected from any minimum value of about 0, 5, 10, 15, 20, 25, 30, 35, 40, 45, 50, 55, 60, 65, 70, or 75 g/L, to any maximum value of about 75, 80, 85, 90, 95, 100, 105, 110, 115, 120, 125, 130, 135, 140, 145, or 150 g/L.

Suitable seed material can be any material the permits the recovery of precipitates having the desired characteristics. In one embodiment, commercially available Bayferrox™ 105M or 130M (Lanxess) iron oxide pigments can be used. In various embodiments, seed material can be recycled within the process and externally purchased material will then not be required. This seed material will be diverted from the product stream from the pressure precipitation stage (402) and will be recycled as required. The recycled seed may be subjected to grinding in order to further improve the desired characteristics of the precipitated product. In general, seed ratio refers to the quantity of seed solids versus the quantity of new iron oxide precipitates. In various embodiments, this process utilizes seed ratios from about 20% to about 2000%.

This size range is characteristic of pigment grade iron oxides. In various embodiments of the process, as seeding ratio and temperature are adjusted, the particle size of the precipitate can be modulated. As the particle size increases, the colour shade of the precipitates gradually changed from a fine "yellow-shade" red to a coarse "blue-shade" red. A selected particle size is any that is desirable. In some embodiments the selected particle size may be finer and a high seeding ratio, or alternatively a lower temperature may be used in the process. If coarser particle sizes are desired, a lower seeding ratio, or alternatively a higher temperature may be used in the process.

In various embodiments, the ferric oxide precipitates obtained from the seeded precipitation process have an L* of about 40 to about 60. In various embodiments, the ferric oxide precipitates obtained from the seeded precipitation process have an L* of about 49 to about 55. In alternative embodiments the ferric oxide precipitates can have an L* selected from any minimum value of about 40, 41, 42, 43, 44, 45, 46, 47, 48, 49 or 50, to any maximum value of about 50, 51, 52, 53, 54, 55, 56, 57, 58, 59 or 60. In various embodiments, the ferric oxide precipitates obtained from the seeded precipitation process have an a* of about 10 to about 40. In various embodiments, the ferric oxide precipitates obtained from the seeded precipitation process have an a* of about 19 to about 33. In alternative embodiments the ferric oxide precipitates can have an a* selected from any minimum value of about 10, 11, 12, 13, 14, 15, 16, 17, 18, 19, 20, 21, 22, 23, 24 or 25 to any maximum value of about 25, 26, 27, 28, 29, 30, 31, 32, 33, 34, 35, 36, 37, 38, 39 or 40. In various embodiments, the ferric oxide precipitates obtained from the seeded precipitation process have a b* of about 5 to about 35. In various embodiments, the ferric oxide precipitates obtained from the seeded precipitation process have a b* of about 12 to about 28. In alternative embodiments, the ferric oxide precipitates can have a b* selected from any minimum value of about 5, 6, 7, 8, 9, 10, 11, 12, 13, 14, 15, 16, 17, 18, 19 or 20 to any maximum value of about 20, 21, 22, 23, 24, 25, 26, 27, 28, 29, 30, 31, 32, 33, 34 or 35.

EXAMPLES

The metallurgical dust used in the following tests was produced as the result of a steel making operation and was EAF dust. The EAF dust that was provided for the various tests,

Example I

Metallurgical Dust Pressure Nitric Acid Leach Tests

These examples demonstrate the feasibility of precipitating ferric oxide and solubilizing other metals from a slurry of metallurgical dust and nitric acid. The processing is performed in a pressurized vessel with the application of heat with conditions selected to obtain good separation of ferric oxide solids. The leach temperatures and free acid levels in the tests were varied in order to explore the results under different conditions. These tests utilized EAF dust samples with the following components, as determined by an elemental analysis.

TABLE 1

| Component | Wt. Percent (%) |
|---|---|
| Iron | 26.0 |
| Zinc | 27.0 |
| Lead | 1.4 |

TABLE 1-continued

| Component | Wt. Percent (%) |
|---|---|
| Cadmium | 0.081 |
| Manganese | 3.4 |
| Chrome | 0.25 |

A quantity (240 g.) of EAF dust was pulped with 400 mL of deionized water and mixed with a mechanical mixer in a reactor vessel. The reactor vessel was a Parr pressure reactor (Parr Instrument Co., Moline, Ill.) with stirring. While mixing, 69% nitric acid was slowly added (over a period of 30 minutes) to the mixture. The acid was added to produce an overall acid addition ratio of 1175 g of 69% acid per kg of dry dust. The slurry was allowed to mix for 60 minutes from the time of the last acid addition. At the end of the mix time, a 25 mL pulp sample was removed from the vessel and filtered. The sample solution (filtrate) was collected and submitted for analysis. The sample filter cake residue was washed with deionized water, dried, and weighed. A portion of the filter cake was analyzed for composition.

An additional amount of 69% nitric acid was added to the pre-mixed dust slurry prior to introducing the slurry into the reactor vessel. The material in the reactor vessel was mixed for an additional 30 minutes, and then the autoclave vessel was sealed.

The material in the autoclave vessel was heated to 180-220° C. for 3 hours, via external vessel heating. The pressure in the vessel was monitored such that the vessel was vented if the pressure approached 500 psig. Kinetic samples, i.e., intermediate samples, of the autoclave material were taken at 1 hour and at 2 hours from the time the material reached temperature. The kinetic pulp samples were filtered, and the pressure leach solution samples (filtrate) were collected and analyzed. The filter cake residue samples were washed with deionized water, dried, weighed, and analyzed.

At the end of 3 hours, the autoclave was cooled and the pressure was relieved. The filtrate was collected and analyzed. The filter cake residue was displacement washed 3 times with fresh water. The wash solutions were combined and analyzed. The washed filter cake residue was dried, weighed and analyzed.

The initial leach (at atmospheric pressure) and the pressure acid leach conditions are summarized below:

| Initial Mix | | Added To Initial Mix For Pressure Acid Leach | |
|---|---|---|---|
| Feed weight (g) | 240 | Deionized water (g) | 200 |
| Deionized water (g) | 400 | 69% nitric acid (g) | varied |
| 69% nitric acid (g) | 282 | Pulp density (% solids w/w) | 15-20 |
| Time (min.) | 60 | Temperature (° C.) | 180-220 |
| Pulp Density (% solids w/w) | 26.0 | Time (at temperature) (min.) | 180 |

Table 2 provides the key operating conditions for the autoclave leach tests. By the time that the reactor was up to temperature, the pressure in the reactor generally ranged between 360 psig and 500 psig when the reactor was at about 220° C. and greater than 100 psig when the leaching was performed at 180° C. Table 3 provides results of analysis of the samples taken during and at the completion of the leaching process.

TABLE 2

| | PREMIX | | | PAL | | | | |
|---|---|---|---|---|---|---|---|---|
| Test No. | 69% Nitric (kg/t feed) | Pulp Density % solids | Leach Time (h) | 69% Nitric (kg/t feed) | Pulp Density % solids | Temp ° C. | Oxygen over psi | Leach Time (h) |
| PAL 1 | 1175 | 26 | 1 | 467 | 19.4 | 220 | 0 | 3 |
| PAL 2 | 1175 | 26 | 1 | 467 | 19.4 | 180 | 0 | 3 |
| PAL 3 | 1175 | 26 | 1 | 700 | 18.6 | 220 | 0 | 3 |
| PAL 4 | 1175 | 26 | 1 | 933 | 17.8 | 220 | 0 | 3 |
| PAL 5 | 1175 | 26 | 1 | 933 | 17.8 | 220 | 50 | 3 |
| PAL 6 | 1175 | 26 | 1 | 1050 | 17.5 | 220 | 0 | 3 |
| PAL 7 | 1175 | 26 | 1 | 1050 | 17.5 | 220 | 0 | 3 |

Note:
PAL 7 is a repeat of PAL 5 with a finer grind

TABLE 3

Test Results

| Test No | Retention Time (h) | Filtrate Assays (g/L) | | | | | | Free Acid (g/L) | Assays (%) | | |
|---|---|---|---|---|---|---|---|---|---|---|---|
| | | Cd | Cr | Fe | Mn | Pb | Zn | | Cd | Cr | Fe |
| PAL 1 | Premix | | | | | | | 4 | 0.0130 | 0.37 | 45 |
| | 1 | 220 | 8.7 | 440 | 7600 | 3500 | 57700 | 17 | 0.0030 | 0.50 | 58 |
| | 2 | 220 | 1.6 | 86 | 8300 | 3500 | 61000 | 13 | 0.0021 | 0.40 | 50 |
| | 3 | 240 | 3.3 | 230 | 8500 | 3600 | 63100 | 13 | 0.0023 | 0.6 | 58 |
| PAL 4 | 1 | 220 | 46 | 1100 | 8400 | 3800 | 69000 | 44 | 0.0016 | 0.41 | 45 |
| | 2 | 210 | 6.9 | 260 | 8500 | 3500 | 68000 | 36 | 0.0005 | 0.48 | 56 |
| | 3 | 220 | 6.4 | 500 | 9100 | 3700 | 72000 | 40 | 0.0005 | 0.58 | 57 |
| PAL 3 | 1 | 200 | 47 | 1900 | 7900 | 3300 | 64000 | 62 | 0.0022 | 0.44 | 50 |
| | 2 | 210 | 24 | 700 | 8000 | 3300 | 62000 | 62 | 0.0020 | 0.47 | 53 |
| | 3 | 220 | 33 | 1800 | 8600 | 3500 | 67000 | 63 | 0.0025 | 0.56 | 56 |

TABLE 3-continued

Test Results

| | | | | | | | | | | | |
|---|---|---|---|---|---|---|---|---|---|---|---|
| PAL 6 | 1 | 217 | 70 | 2690 | 8770 | 3470 | 71000 | 100 | 0.0001 | 0.35 | 53 |
| | 2 | 228 | 44 | 1540 | 9420 | 3660 | 75300 | 105 | 0.0001 | 0.45 | 55 |
| | 3 | 210 | 85 | 3930 | 8460 | 3310 | 67900 | 91 | 0.0001 | 0.44 | 54 |
| PAL 5 | 2 | 220 | 91 | 1560 | 9020 | 3500 | 73700 | 80 | 0.002 | 0.37 | 52 |
| | 2.5 | 221 | 57 | 640 | 8950 | 3500 | 72500 | 77 | 0.002 | 0.37 | 54 |
| | 3 | 221 | 72 | 1840 | 8760 | 3460 | 71600 | 77 | 0.002 | 0.49 | 48 |
| PAL 2 | Premix | 330 | 210 | 10000 | 2900 | 5700 | 84000 | . . . | 0.0120 | 0.37 | 41 |
| | 1 | 200 | 250 | 4700 | 4200 | 3500 | 55000 | 55 | 0.0067 | 0.28 | 43 |
| | 2 | 220 | 290 | 2900 | 5900 | 4000 | 64000 | 43 | 0.0054 | 0.29 | 47 |
| | 3 | 230 | 290 | 2400 | 8000 | 3900 | 69000 | 23 | 0.0046 | 0.32 | 51 |
| PAL 7 | Premix | . . . | . . . | . . . | . . . | . . . | . . . | . . . | 0.013 | 0.36 | 41 |
| | 1 | 200 | 87 | 1700 | 8000 | 3100 | 64000 | 75 | 0.0018 | 0.47 | 54 |
| | 2 | 190 | 76 | 1200 | 7700 | 3000 | 61000 | 70 | 0.0005 | 0.5 | 58 |
| | 3 | 170 | 60 | 880 | 7400 | 3000 | 64000 | 80 | 0.0005 | 0.55 | 59 |

| Test No | Retention Time (h) | Assays (%) | | | Dissolution (%) | | | | | |
|---|---|---|---|---|---|---|---|---|---|---|
| | | Mn | Pb | Zn | Cd | Cr | Fe | Mn | Pb | Zn |
| PAL 1 | Premix | 5.60 | 0.1 | 14.0 | | | | | | |
| | 1 | 0.99 | 0.0 | 3.7 | 98.5 | 1.5 | 0.7 | 87.3 | 98.6 | 93.3 |
| | 2 | 0.54 | 0.0 | 2.5 | 99.0 | 0.4 | 0.2 | 93.3 | 98.9 | 95.7 |
| | 3 | 0.61 | 0.0 | 2.6 | 98.9 | 0.5 | 0.3 | 92.3 | 98.7 | 95.4 |
| PAL 4 | 1 | 0.26 | 0.036 | 0.83 | 99.1 | 8.0 | 1.9 | 96.1 | 98.8 | 98.5 |
| | 2 | 0.10 | 0.027 | 0.16 | 99.8 | 1.4 | 0.4 | 98.8 | 99.2 | 99.8 |
| | 3 | 0.06 | 0.032 | 0.20 | 99.7 | 1.1 | 0.8 | 99.3 | 99.0 | 99.7 |
| PAL 3 | 1 | 0.23 | 0.05 | 0.98 | 98.8 | 8.6 | 3.2 | 96.8 | 98.4 | 98.3 |
| | 2 | 0.12 | 0.05 | 0.70 | 99.0 | 4.6 | 1.2 | 98.4 | 98.4 | 98.8 |
| | 3 | 0.14 | 0.06 | 0.84 | 98.8 | 5.5 | 3.0 | 98.3 | 98.3 | 98.7 |
| PAL 6 | 1 | 0.14 | 0.029 | 0.42 | 99.5 | 15.9 | 4.6 | 98.3 | 99.1 | 99.4 |
| | 2 | 0.08 | 0.013 | 0.06 | 99.5 | 7.8 | 2.4 | 99.0 | 99.1 | 99.9 |
| | 3 | 0.09 | 0.020 | 0.11 | 99.5 | 16.9 | 15.2 | 99.0 | 99.1 | 99.8 |
| PAL 5 | 2 | 0.11 | 0.030 | 0.43 | 99.2 | 21.3 | 3.2 | 98.9 | 98.4 | 99.5 |
| | 2.5 | 0.03 | 0.013 | 0.06 | 99.2 | 17.3 | 3.5 | 99.7 | 98.4 | 99.9 |
| | 3 | 0.11 | 0.050 | 0.67 | 99.9 | 12.2 | 3.5 | 98.7 | 98.2 | 99.0 |
| PAL 2 | Premix | 5.10 | 0.085 | 13.0 | 93.7 | 23.3 | 11.6 | 23.4 | 97.3 | 77.6 |
| | 1 | 3.60 | 0.053 | 11.0 | 96.1 | 42.2 | 8.2 | 48.8 | 98.2 | 80.3 |
| | 2 | 2.90 | 0.040 | 9.4 | 96.8 | 42.6 | 4.4 | 60.2 | 98.7 | 83.5 |
| | 3 | 1.40 | 0.045 | 5.9 | 97.5 | 41.1 | 3.6 | 81.3 | 98.5 | 90.0 |
| PAL 7 | Premix | 5.2 | 0.078 | 14 | 93.1 | 24.0 | 11.7 | 20.2 | 97.0 | 74.7 |
| | 1 | 0.077 | 0.024 | 0.22 | 99.2 | 16.8 | 3.3 | 99.1 | 99.3 | 99.7 |
| | 2 | 0.023 | 0.021 | 0.034 | 99.8 | 15.0 | 2.3 | 99.7 | 99.4 | 100.0 |
| | 3 | 0.024 | 0.021 | 0.04 | 99.8 | 11.7 | 1.8 | 99.7 | 99.4 | 100.0 |

Summary of Results for PAL1-PAL7

It appears that, generally, the increased temperature and increased free acid levels result in more complete dissolution of the EAF dust ferrite content and, consequently, lower residue solids impurity levels.

Table 4 summarizes the TCLP (Toxicity Characteristic Leaching Procedure) results for Samples PAL1 and PAL 4, and also contains the EPA limits for delisting a material produced from a hazardous waste.

TABLE 4

| | As (mg/L) | Ba (mg/L) | Cr (mg/L) | Hg (mg/L) | Ni (mg/L) | Pb (mg/L) |
|---|---|---|---|---|---|---|
| EPA limit (delisting) | 0.5 | 7.6 | 0.33 | 0.001 | 1.0 | 0.15 |
| PAL I | <0.05 | 0.10 | 0.10 | <0.001 | <0.02 | 0.02 |
| PAL 4 | <0.05 | 0.17 | <0.02 | <0.001 | 0.04 | 0.10 |

These results demonstrate that the attraction of the non-ferrous metals except for chromium was very high, and generally reached levels of 99+. The final iron product generally included the chrome content of the initial dust. However, the use of higher acid levels generally resulted in greater removal of the non-ferrous metals, and a corresponding lower impurity level. An iron content approaching 60% indicates that the iron was present in the form of crystalline hematite with a quantity (10-15 weight %) dust insolubles (silicates). The recovery of iron was greater than 95 weight percent. The levels of zinc, manganese and lead decreased with increasing amounts of free acid. The extraction of the non-ferrous metals into the solution generally seemed complete after about 2 to 2.5 hours.

Example 2

Pressurized Leach Results with Second Experimental Setup

These examples demonstrate the feasibility of precipitating ferric oxide and solubilizing other metals from a slurry of metallurgical dust and nitric acid. The processing is performed in a pressurized vessel with the application of heat with conditions selected to obtain good separation of ferric oxide solids. The leach temperatures and free acid levels in the tests were varied in order explore the results under different conditions. These tests were performed similarly to those in example 1 using an alternative test setup. These tests utilized EAF dust samples with the following components, as determined by an elemental analysis.

TABLE 5

| Component | Wt. Percent (%) |
|---|---|
| Iron | 22.0 |
| Zinc | 23.7 |
| Lead | 2.1 |
| Cadmium | 0.073 |
| Manganese | 2.87 |
| Chrome | 0.20 |

A quantity of EAF dust (310 g wet weight/249 g dry weight) was pulped using 30 minutes of mixing with 748 g of 44.2 weight percent nitric acid to give a slurry weight of 997 g with 25 weight percent solids. This initial mixing was performed prior to heating. These tests were also performed in a pressurized reactor at a temperature of 220 degrees C. for 120 minutes. The maximum pressure for these experiments was 620 psig with no bleed. As shown in Table 6, this test again demonstrates the ability of the pressurized leach process to obtain ferric oxide purities below the EPA limits such that the materials are no longer hazardous waste.

TABLE 6

| | As (mg/L) | Ba (mg/L) | Cr (mg/L) | Hg (mg/L) | Ni (mg/L) | Pb (mg/L) |
|---|---|---|---|---|---|---|
| EPA limit (delisting) | 0.5 | 7.6 | 0.33 | 0.001 | 1.0 | 0.15 |
| 2868-12 | <0.03 | 1.6 | 0.01 | <0.0001 | 0.006 | <0.073 |

Example 3

Secondary Leach of Test Residue

Products from a first pressurized leach were subjected to a second pressurized leach to demonstrate further reductions in the contaminant levels. One of these tests was performed with products from Example 1 and a second test was performed with products from Example 2.

A 35 g dry weight sample of filter cake residue produced from a single leach process (residue is from PAL6 of Example 1), was repulped with 706 g of deionized water and 40 g of 59 weight percent fresh nitric acid solution and re-leached. The nitric acid was added to the residue prior to the introduction of the mixture to the reactor. The leach slurry was approximately 20% solids. A stirred Parr pressure reactor was utilized with a steam pressure of about 317 psig. The "second stage" pressure leach tests were performed in a manner similar to the first stage leach tests. Generally, the second leaching step was able to further reduce the impurity levels in the iron residue product of a single-stage leach. Table 7 provides the results from the secondary leach.

TABLE 7

| Test | Deg C. | Free Acid | Fe (%) | Zn (%) | Pb (%) | Cd (%) | Mn (%) | Cr (%) |
|---|---|---|---|---|---|---|---|---|
| 1st Leach (PAL 6) | 220 | 91 | 54 | 0.11 | 0.021 | 0.001 | 0.088 | 0.44 |
| 2nd Leach (PAL 6) | 220 | 37 | 59 | 0.03 | <0.02 | <0.0005 | 0.067 | 0.53 |

A second two stage leach test was also performed based on the product from the pressurized leach process as described in Example 2 with the amount of nitric acid as described below. Initial residue was prepared by adding 300 g of water washed dust filter cake (240 g solids dry weight) to 720 g of 27% nitric acid. The slurry was allowed to mix for 20 minutes before being added to a Parr pressure reactor. The reactor temperature was then raised to 220 degrees C. and held for 3 hours at temperature. The pressure leach stage resulted in a low final residual free nitric acid level of 15 g/L which resulted in incomplete dust dissolution. In the second pressurized leach test, 80 g of dry residue from this first test was combined with 320 g of 20% nitric acid and reacted in an autoclave for 1.5 hours at 220° C. (2868-8). The final residue had low residual impurity levels, as presented in Table 8.

TABLE 8

| Test | Deg C. | Free Acid (g/L) | Fe (%) | Zn (%) | Pb (%) | Cd (%) | Mn (%) | Cr (%) |
|---|---|---|---|---|---|---|---|---|
| 1st Leach | 220 | 15 | 42 | 9.9 | 0.102 | 0.009 | 3.7 | 0.36 |
| 2nd Leach | 220 | 82 | 56 | 0.10 | 0.008 | N/A | 0.08 | N/A |

The second leach is able to significantly increase the purity of the ferric oxide with respect to non-ferrous metals except for chromium. This is true even if the first leach was performed under conditions of lower free acid levels (incomplete dissolution).

Example 4

Preleach Tests

This experiment demonstrates that the performance of a first leach step at atmospheric pressures can effectively reduce impurity levels prior to performance of further processing.

The pH of the slurry can be controlled to adjust the purity of the product from this atmospheric leach. The test were performed with a slurry with about 30 weight % solids. A 240 g quantity of solids was combined with 400 g water. Then, 69 weight percent nitric acid was added to obtain the desired test pH. The test conditions for four runs are presented in Table 9.

TABLE 9

| Test No. | pH | Pulp Density % solids | Leach Time (min) | Temp (° C.) | 69% Nitric (kg/t feed) |
|---|---|---|---|---|---|
| NL-3 | 1.5-2.0 | ~30 | 240 | 25 | 572 |
| NL-2 | 1.0-1.5 | ~30 | 240 | 25 | 664 |
| NL-4 | 0.5-1.0 | ~30 | 240 | 25 | 725 |
| NL-5 | 1.0-1.5 | ~30 | 240 | 80 | 704 |

A denotes feed added to acid solution.

The solid residue from the test was further analyzed. The results of the analysis are presented in Table 10.

TABLE 10

| Test No | Retention Time (h) | Solution Assays (mg/L) | | | | | | Residue Assays (%) | | | | | | Dissolution (%) | | | | | |
|---|---|---|---|---|---|---|---|---|---|---|---|---|---|---|---|---|---|---|---|
| | | Cd | Cr | Fe | Mn | Pb | Zn | Cd | Cr | Fe | Mn | Pb | Zn | Cd | Cr | Fe | Mn | Pb | Zn |
| NL-3 | 0 | 331 | 0.735 | 1.4 | 940 | 3760 | 69000 | 0.0253 | 0.34 | 35 | 4.7 | 0.806 | 19 | 81.1 | 0.1 | 0.0 | 6.2 | 60.5 | 54.4 |
| | 1 | 330 | 1.29 | 11 | 1100 | 3910 | 71000 | 0.0235 | 0.36 | 36 | 4.8 | 0.742 | 18 | 83.9 | 0.1 | 0.0 | 7.8 | 66.2 | 59.4 |
| | 2 | 339 | 3.5 | 37 | 1200 | 4300 | 75000 | 0.0180 | 0.38 | 37 | 5.1 | 0.496 | 17 | 88.3 | 0.4 | 0.0 | 8.7 | 77.7 | 64.0 |
| | 3 | 357 | 0.417 | 1.5 | 1200 | 4160 | 73000 | 0.0181 | 0.37 | 37 | 4.9 | 0.637 | 16 | 87.7 | 0.0 | 0.0 | 8.1 | 70.2 | 62.2 |
| | 4 | 332 | 0.55 | 2.9 | 1200 | 4070 | 77000 | 0.0201 | 0.40 | 40 | 5.2 | 0.637 | 18 | 85.6 | 0.1 | 0.0 | 7.7 | 69.8 | 60.7 |
| NL-2 | 0 | 320 | 12 | 310 | 1100 | 4400 | 72000 | 0.0200 | 0.38 | 38 | 4.9 | 0.61 | 16 | 86.0 | 1.2 | 0.3 | 8.0 | 73.5 | 63.4 |
| | 1 | 330 | 15 | 420 | 1300 | 4900 | 79000 | 0.0150 | 0.40 | 40 | 5.1 | 0.48 | 15 | 90.7 | 1.6 | 0.5 | 10.1 | 81.8 | 69.9 |
| | 2 | 310 | 28 | 1100 | 1300 | 4300 | 66000 | 0.0130 | 0.38 | 39 | 5.2 | 0.30 | 15 | 91.6 | 3.3 | 1.3 | 10.3 | 86.8 | 66.9 |
| | 3 | 310 | 32 | 1000 | 1300 | 4800 | 75000 | 0.0140 | 0.39 | 40 | 5.5 | 0.28 | 15 | 92.5 | 4.4 | 1.4 | 11.7 | 90.6 | 73.7 |
| | 4 | 330 | 22 | 460 | 1400 | 4700 | 76000 | 0.0160 | 0.42 | 41 | 5.1 | 0.40 | 15 | 91.5 | 2.7 | 0.6 | 12.6 | 86.0 | 72.7 |
| NL-4 | 0 | 320 | 39 | 1500 | 1300 | 4800 | 74000 | 0.0199 | 0.39 | 39 | 5.1 | 0.43 | 16 | 86.3 | 3.7 | 1.5 | 9.1 | 81.5 | 64.4 |
| | 1 | 290 | 61 | 3700 | 1300 | 4800 | 72000 | 0.0144 | 0.40 | 40 | 5.5 | 0.29 | 16 | 90.7 | 7.0 | 4.3 | 10.3 | 88.8 | 68.6 |
| | 2 | 340 | 81 | 4500 | 1600 | 5200 | 81000 | 0.0132 | 0.39 | 41 | 5.5 | 0.23 | 15 | 92.5 | 9.1 | 5.0 | 12.2 | 91.7 | 72.1 |
| | 3 | 330 | 120 | 6400 | 1700 | 5300 | 82000 | 0.0130 | 0.39 | 41 | 5.5 | 0.20 | 15 | 92.5 | 12.9 | 7.1 | 13.1 | 92.7 | 72.7 |
| | 4 | 320 | 130 | 6900 | 1800 | 4900 | 78000 | 0.0128 | 0.34 | 43 | 5.9 | 0.18 | 16 | 96.2 | 15.3 | 7.1 | 12.6 | 93.0 | 69.8 |
| NL-5 | 0 | 277 | 2.19 | 21 | 1100 | 3680 | 58000 | 0.0160 | 0.38 | 35 | 4.9 | 0.43 | 15 | 89.9 | 0.3 | 0.0 | 10.3 | 81.5 | 66.5 |
| | 1 | 304 | 1.23 | 33 | 1300 | 3770 | 63000 | 0.0140 | 0.38 | 36 | 5.0 | 0.44 | 15 | 90.8 | 0.1 | 0.0 | 10.5 | 79.5 | 65.5 |
| | 2 | 301 | 116 | 620 | 2000 | 5000 | 74000 | 0.0140 | 0.40 | 38 | 5.2 | 0.12 | 13 | 92.2 | 13.8 | 8.3 | 17.5 | 95.8 | 75.9 |
| | 3 | 324 | 14.1 | 230 | 1800 | 4930 | 78000 | 0.0130 | 0.42 | 37 | 4.8 | 0.25 | 13 | 92.0 | 1.5 | 0.3 | 14.8 | 90.1 | 73.5 |
| | 4 | 344 | 29.2 | 200 | 2200 | 5430 | 86000 | 0.0110 | 0.40 | 38 | 4.7 | 0.17 | 12 | 92.9 | 2.9 | 0.2 | 16.3 | 93.0 | 74.9 |

These results show that the pH can be adjusted to dissolve significant quantities of the non-ferrous metals while leaving most of the iron in the solids. Thus, a more purified solid can be used in the resulting pressurized leach.

Example 5

XRF (Crystallinity) Data

This example presents x-ray data showing that the recovered $Fe_2O_3$ is in crystalline hematite form.

Figure 4:
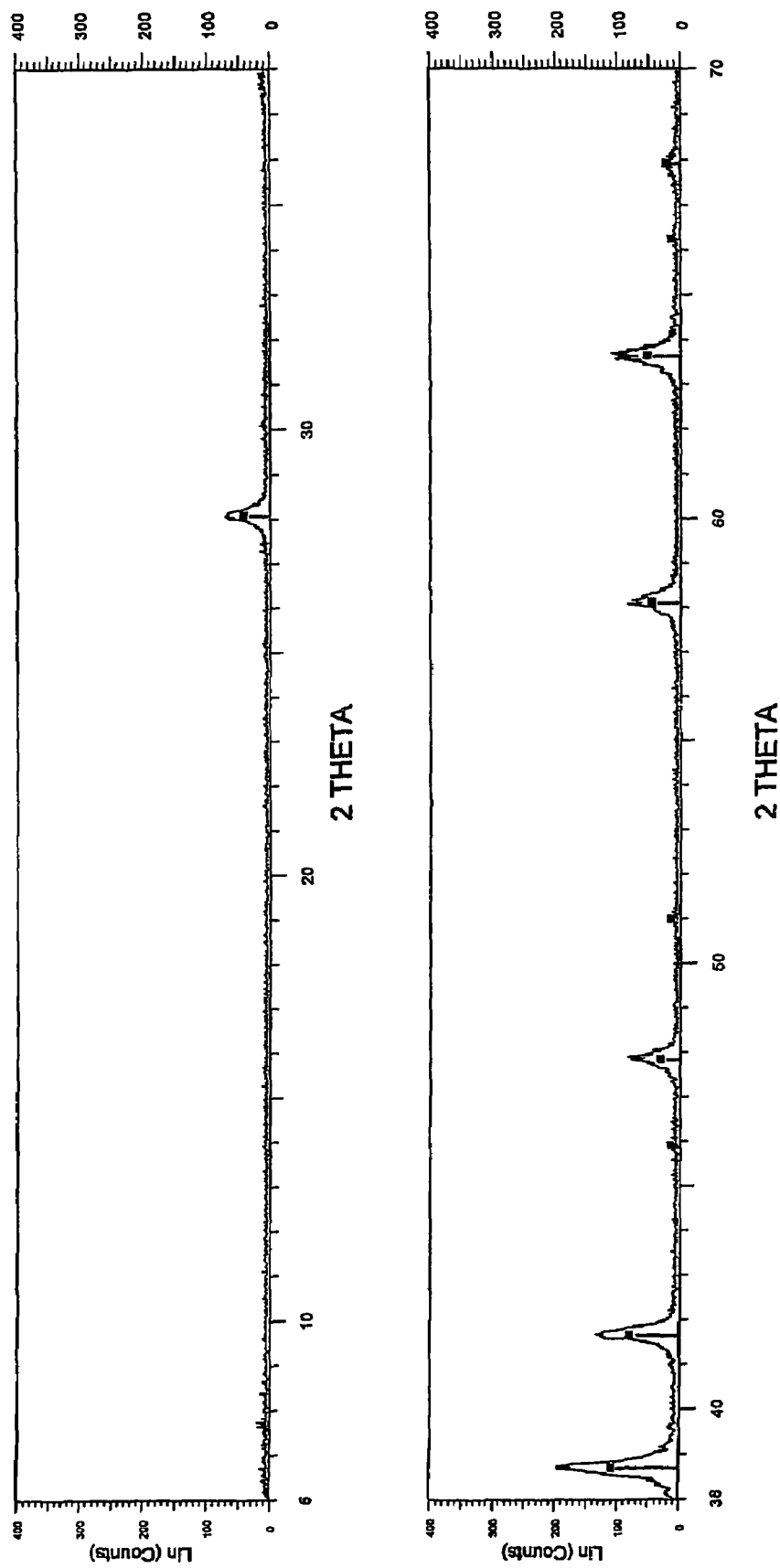
FIG. 4 is an x-ray diffractogram for one sample following a pressurized leach treatment.
Figure 5:
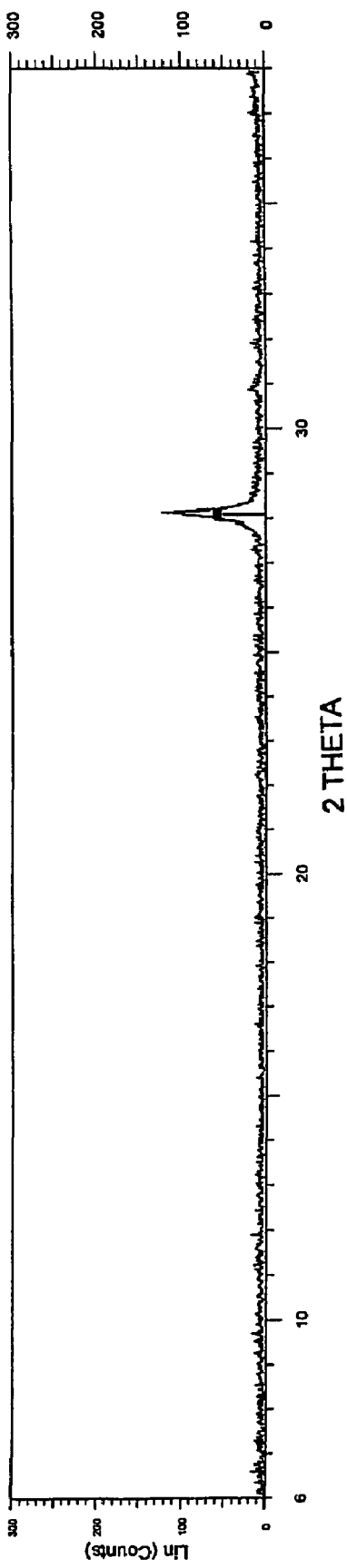
FIG. 5 is an x-ray diffractogram of another sample following a pressurized leach treatment.
Figure 5:
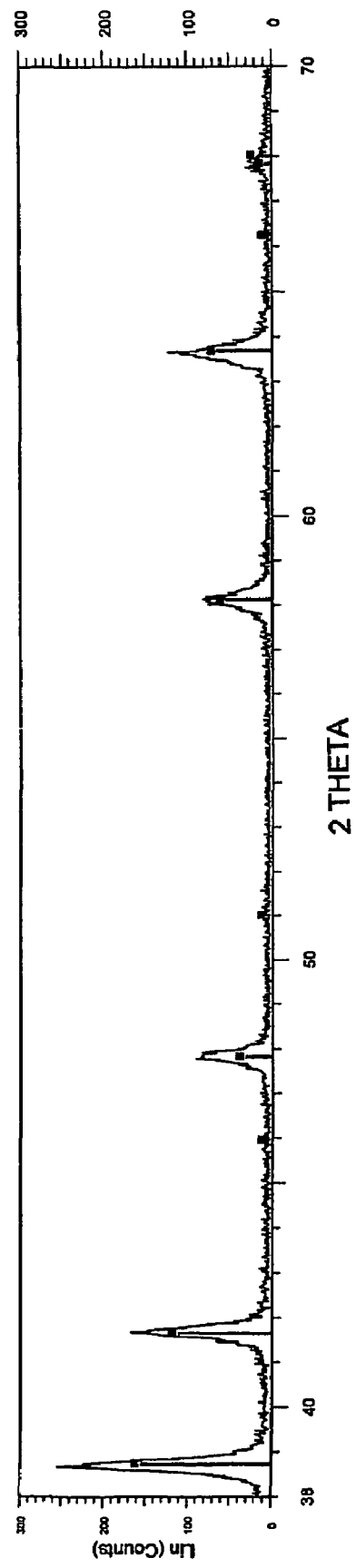
Figure 6:
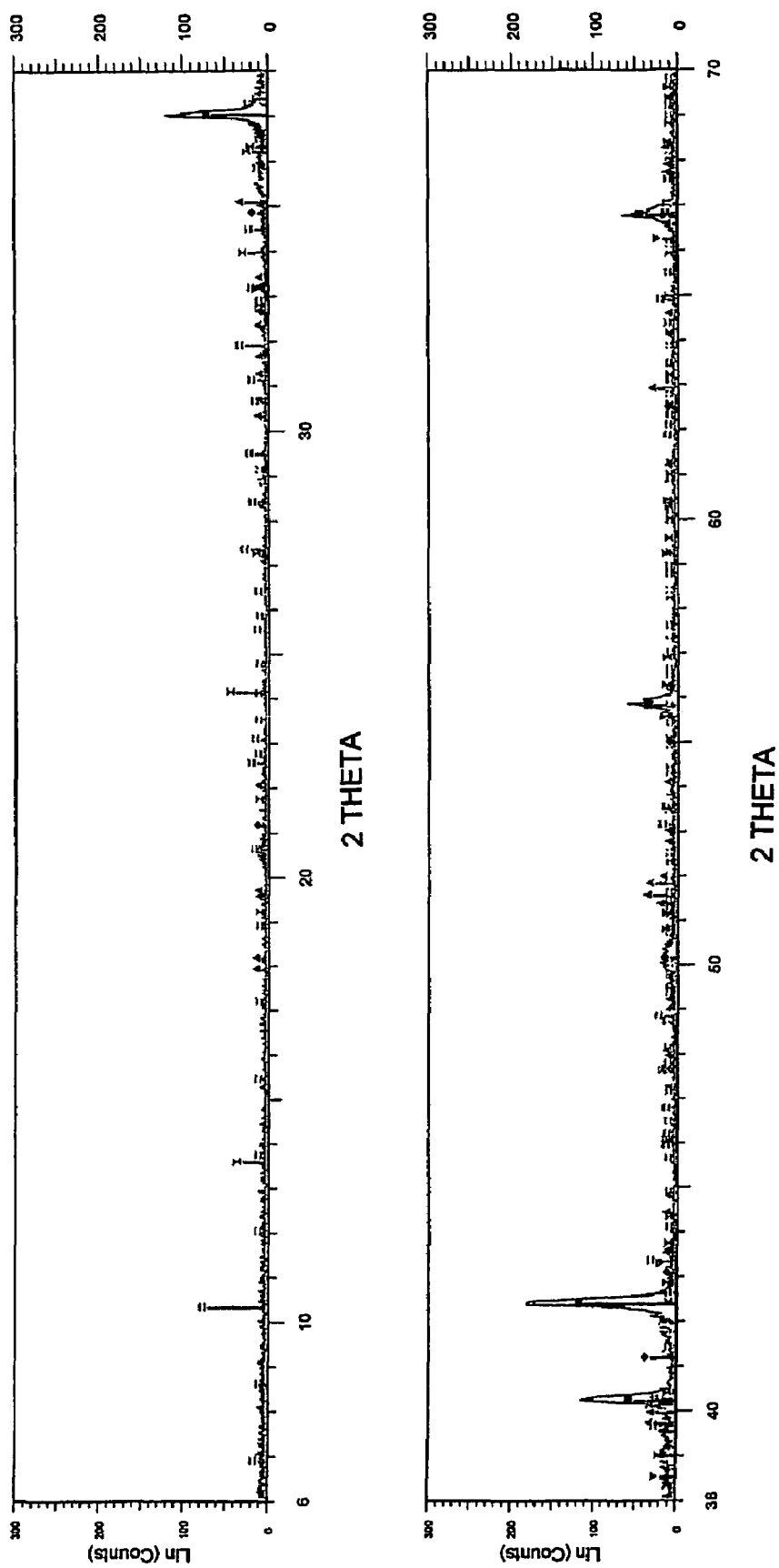
FIG. 6 is an x-ray diffractogram of an EAF dust sample prior to a nitric acid treatment.

Referring to FIGS. 4 and 5, the x-ray diffraction data is shown for Samples Pal 6 and 2868-12 from the examples above. The x-ray diffraction data was obtained on a Siemens D5000 diffractometer using Co radiation. The major crystalline components from these diffractograms is hematite $Fe_2O_3$. For comparison, an x-ray diffractogram is shown in FIG. 6 for the material prior to performing the leach. This material demonstrates a majority phase of zincite (ZnO) and minor phases of gypsum ($CaSO_4 \cdot 2H_2O$), magnetite ($Fe_3O_4$), pyrite ($FeS_2$) and pyrrhotite ($Fe_{(1-x)}S$) as well as traces of other crystalline forms.

The following examples are related to the modified process.

Example 6

Batch Tests for Seeded Process

The salt solution for the tests was prepared by mixing reagent grade ferric nitrate salts with deionized water to obtain the desired initial dissolved iron concentration. In another embodiment, iron solids are solubilized in nitric or sulphuric acid. A 69% solution of nitric acid was added to produce a residual free acid level that would be indicative of a solution produced by a reaction between nitric acid and an iron solid such as magnetite. The following series of tests was performed utilizing various reaction conditions. Some experimental parameters that were examined include: iron concentration, free acid concentration, seed ratio (ratio of iron in seed solids to dissolved iron in initial salt solution), temperature and reaction time.

A 2 liter Parr heated pressure reactor vessel was used for all tests. The vessel was equipped with a mechanical mixer for agitation. For each test, approximately 1000 mL of feed solution was added to the reactor along with the desired quantity of seed solids. Bayferrox™ 105M (Lanxess) iron oxide pigment material was used as the seed for the tests. The reactor is sealed and heated to a target temperature with an associated pressure. For example, at 50 g/L of initial iron in solution temperatures and pressures of approximately 155 psig at 175° C. up to approximately 500 psig at 240° C. can be used. Following the completion of the reaction time, the reactor was cooled and the pressure relieved. The slurry was filtered and the filtrate collected and analyzed. Many conventional solid/liquid separation techniques can be used at this stage, for example, sedimentation, filtration, centrifugation, etc. The filter cake residue was displacement washed with fresh water and the wash solutions were combined and analyzed. The washed filter cake residue was dried, weighed and analyzed.

Figure 8:
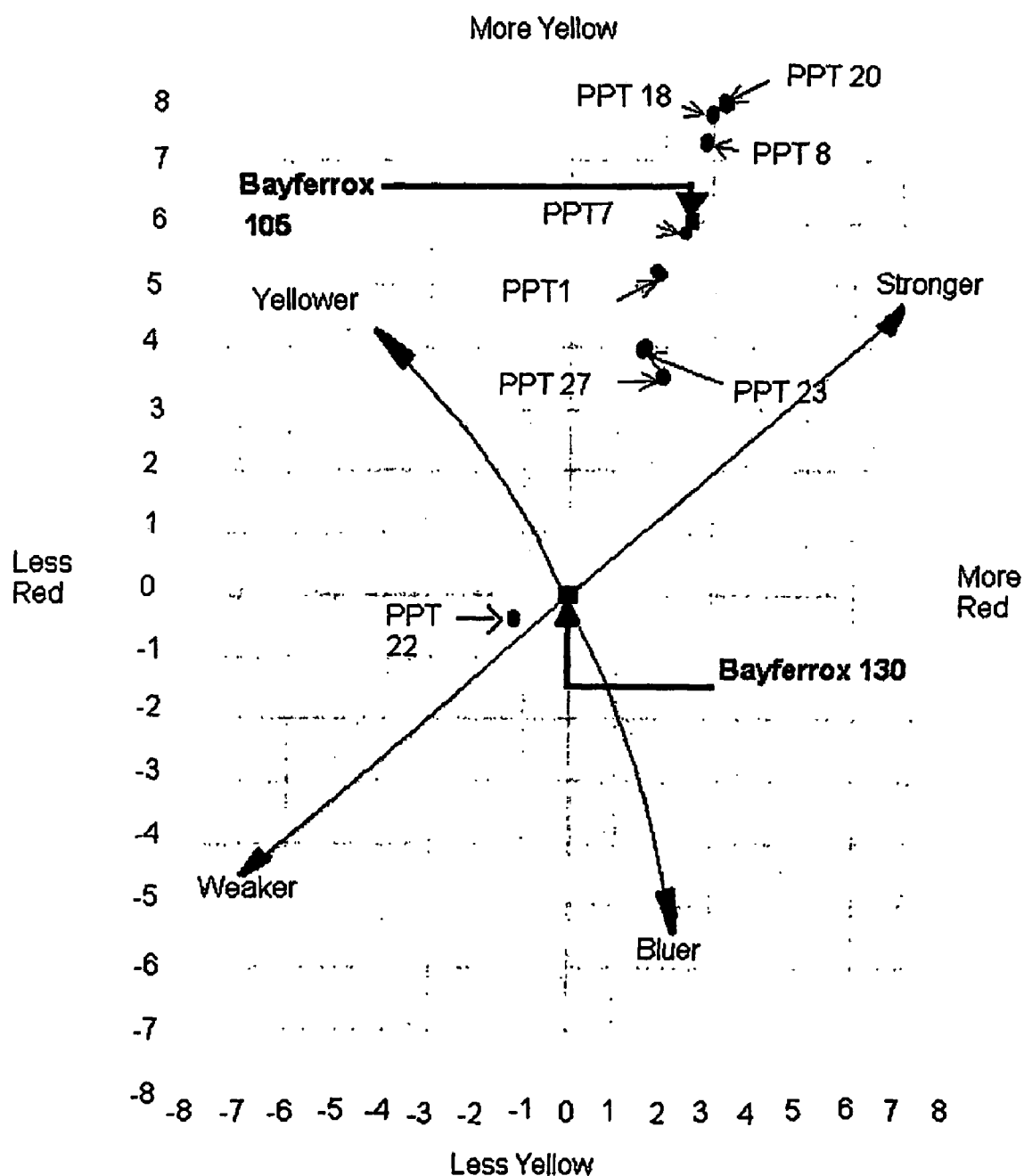
FIG. 8 illustrates the size and colour of the precipitates obtained under different reaction conditions of the seeded processes.

Several tests were conducted to analyze the precipitated solids, such as a metal determination by ICP and size analysis using a Micromeretics SediGraph™ 5100 analyzer. Particle diameters are indicated as $d_{50}$ which is the size that 50% of the solids are finer than. The results of these analyses are summarized in Table 11. In addition, the solids are analyzed for colour properties using a CIELAB system. The colour data, summarized in Table 12 and also shown in FIG. 8, was obtained using a Datacolor Spectragraph™ SF450.

TABLE 11

Shown are the various operating conditions used for seeded precipitation tests.

| Test | Temp (° C.) | Seed Ratio (%) | Initial Iron Concentration (g/L) | Initial free acid (g/L) | Reaction Time (hr) |
|---|---|---|---|---|---|
| PPT 22 | 200 | 50 | 49.8 | 32 | 1 |
| PPT 27 | 240 | 100 | 49.8 | 32 | 1 |
| PPT 23 | 200 | 100 | 49.8 | 32 | 1 |
| PPT 1 | 175 | 200 | 49.8 | 32 | 1 |
| PPT 7 | 175 | 200 | 49.8 | 32 | 1 |
| PPT 8 | 175 | 300 | 49.8 | 32 | 1 |
| PPT 18 | 175 | 400 | 49.8 | 32 | 0.5 |
| PPT 20 | 225 | 300 | 49.8 | 32 | 1 |

TABLE 12

A summary of the colour analysis compared to size of the precipitates obtained from the various test conditions summarized in table 11.

| Test | L* | a* | b* | $d_{50}$ |
|---|---|---|---|---|
| PPT 22 | 52.69 | 25 | 16.91 | 1.34 |
| PPT 27 | 50.45 | 28.01 | 20.7 | 0.63 |
| PPT 23 | 52.28 | 27.7 | 21.23 | 0.46 |
| PPT 1 | 52.48 | 27.83 | 22.23 | 0.44 |
| PPT 7 | 52.68 | 28.4 | 23.04 | 0.46 |
| PPT 8 | 52.47 | 28.88 | 24.23 | 0.38 |
| PPT 18 | 51.7 | 29.13 | 24.98 | 0.37 |
| PPT 20 | 51.25 | 29.3 | 25.02 | 0.39 |
| Bayferrox ™ 105M | 53.15 | 29.05 | 24.01 | 0.60 |
| Bayferrox ™ 130M | 50.67 | 25.97 | 16.46 | 0.70 |

To measure the L*a*b* parameters of the test precipitates, U.S. Stoneware jar mills with approximately 500 g zirconium media were used. A mixture of 2.5 g pigment and 25 g of "base 2" white paint was allowed to roll for 1 hour. The mixture was pipetted onto a Leneta opacity chart, where the pigment mixture was spread with a #52 stainless steel rod. Once the layered pigment mixture was dry it was analyzed using a Datacolor™ 450 machine. DataColor™ results shown in table 12 are the actual L* a* b* parameters of the precipitate color.

Synthetic iron oxide pigments are produced commercially in a range of colour shades from "yellow-shade" red pigments to "blue-shade" red pigments. Analysis data for Bayferrox™ 105M and 130M (Lanxess) have been included in Tables 11 and 12 for reference purposes. These pigments are two of the more commonly used synthetic iron oxide products presently available. The PPT samples shown in Table 12 have colour parameters falling into the same general range as Bayferrox™ 105M and 130M.

Samples for particle size analysis were prepared using about 2.5 grams of pigment solids added to 80 ml of 50% glycerin. The pigment and glycerin were then allowed to mix in a beaker using a magnetic stirrer. After 5-10 minutes the mixture was sonicated with 20% power at an amplitude of 40. Once the agglomerates were broken the pigment/glycerin mixture was added to the mixing chamber of the Sedigraph 5100™ analyzer.

The tests, summarized in Tables 11 and 12, demonstrate the ability to control the particle size and precipitate colour characteristics by varying the seeding ratio. Reducing the seeding ratio from 300 to 400% down to 50% increased the precipitate particle sizes (d50) from 0.37 microns up to greater than 1.34 microns. This size range is characteristic of pigment grade synthetic iron oxide materials that are conventionally produced via a Penniman-style process. The use of higher precipitation temperature was also identified as a method to further increase particle size.

As the seeding ratio is reduced and particle size is increased, the colour shade of the precipitates is gradually changed from a "yellow-shade" red (PPT 18 and PPT 20) to a "blue-shade" red (PPT 22). The colour shift can be seen in Table 12 as the "a" and "b" parameters change from values similar to Bayferrox™ 105M at high seed ratios (PPT 18 and PPT 20) to those similar to Bayferrox™ 130M at low seed ratios (PPT 22). This ability to produce a range of pigment-grade shades allows the process to be a viable alternative to more conventional techniques.

A series of additional tests were performed to determine the impact of process parameters on the precipitation of iron oxide solids at elevated temperatures/pressures. Some process parameters that were examined included precipitation temperature, concentration of iron and free nitric acid in the precipitation feed solutions and reaction time. The results of these tests are summarized in Tables 13 to 16. The equipment and procedures for these tests were identical to those outlined for the tests whose results are summarized in Table 11.

TABLE 13

Effect of temperature on precipitation of iron from solution.

| Test | Temp (° C.) | Seed Ratio (%) | Initial Iron concentration (g/L) | Initial free acid (g/L) | Reaction Time (hr) | Iron precipitation from sol'n (%) |
|---|---|---|---|---|---|---|
| PPT 4 | 150 | 300 | 49.8 | 32 | 1 | 40.8 |
| PPT 5 | 175 | 300 | 49.8 | 32 | 1 | 63.1 |
| PPT 6 | 200 | 300 | 49.8 | 32 | 1 | 75.5 |
| PPT 20 | 225 | 300 | 49.8 | 32 | 1 | 87.5 |

TABLE 14

Effect of solution iron concentration on precipitation of iron from solution.

| Test | Temp (° C.) | Seed Ratio (%) | Initial Fe (g/L) | Initial FA (g/L) | Time (hr) | Fe precipitation from sol'n (%) |
|---|---|---|---|---|---|---|
| PPT 11 | 175 | 300 | 38 | 32 | 1 | 70.3 |
| PPT 10 | 175 | 300 | 49.8 | 32 | 1 | 61.6 |
| PPT 12 | 175 | 300 | 54.8 | 33 | 1 | 57.7 |

TABLE 15

Effect of solution free acid concentration on precipitation of iron from solution.

| Test | Temp (° C.) | Seed Ratio (%) | Initial Fe (g/L) | Initial FA (g/L) | Time (hr) | Fe precipitation from sol'n (%) |
|---|---|---|---|---|---|---|
| PPT 10 | 175 | 300 | 49.8 | 33 | 1 | 61.6 |
| PPT 13 | 175 | 300 | 46.0 | 61 | 1 | 55.9 |

TABLE 16

Effect of reaction time on precipitation from or iron from solution.

| Test | Temp (° C.) | Seed Ratio (%) | Initial Fe (g/L) | Initial FA (g/L) | Time (hr) | Fe precipitation from sol'n (%) |
|---|---|---|---|---|---|---|
| PPT 4 | 150 | 300 | 49.8 | 32 | 1 | 40.8 |
| PPT 14 | 150 | 300 | 49.8 | 32 | 0.5 | 33.9 |
| PPT 5 | 175 | 300 | 49.8 | 32 | 1 | 63.1 |
| PPT 15 | 175 | 300 | 49.8 | 32 | 0.5 | 55.6 |
| PPT 6 | 200 | 300 | 49.8 | 32 | 1 | 75.5 |
| PPT 16 | 200 | 300 | 49.8 | 32 | 0.5 | 72.1 |

The CIELAB colour analyses also demonstrate that the colour intensity ("L" parameter) is similar to that of the Bayferrox™ 105M/130M standards. Colour intensity is affected by the size distribution of the pigment materials. The presence of a wide distribution with larger quantities of fine particles results in poorer colour strength (reduced "L" intensity parameter). Table 17 below shows the slope factors of the particle size distributions for the pressure precipitated samples versus those of the Bayferrox™ 105M/130M standards. The distribution slope factors were calculated as $1/(d_{80}-d_{50})$. Particle diameters indicated as $d_{80}$ are the size at which 80% of the solids are finer than. A steeper slope (larger value of $1/(d_{80}-d_{50})$) indicates a narrower size distribution and therefore less fine. The pressure precipitated samples have slope values and colour intensities ("L" parameter) typical (or better) than the range of synthetic iron oxide pigments represented by the Bayferrox™ 105M/130M standards.

TABLE 17

Slope of precipitated iron oxide size distribution curves.

| Test | Slope $1/(d80-d50)$ |
|---|---|
| PAL22 | 0.66 |
| PAL27 | 1.24 |
| PAL23 | 2.60 |
| PAL1 | 2.30 |
| PAL7 | 2.86 |
| PAL8 | 3.75 |
| PAL18 | 3.79 |
| PAL20 | 3.75 |
| Bayer 105 | 2.79 |
| Bayer 130 | 0.78 |

The data summarized in Tables 13 to 17 provides the following insights into the elevated pressure precipitation reactions. Increasing the precipitation temperature shifts the equilibrium point for the iron precipitation reactions and improves the recovery of iron from solution to the iron oxide solids. Increased levels of dissolved iron and free nitric acid in solution shift the equilibrium of the precipitation reactions in the opposite direction and therefore result in reductions in the recovery of iron to the precipitated solids. The impact of solution concentration changes is greatest for the dissolved iron levels due to the fact that each mole of dissolved iron generates 3 moles of free nitric acid when the iron is precipitated.

At lower precipitation temperatures (150-175° C.) there is a noticeable improvement in iron precipitation recovery when the reaction time is increased from 0.5 to 1.0 hours. As the precipitation temperature is increased (200° C.) the reaction kinetics increase to the point that the precipitation reactions are essentially complete after 0.5 hours. Further increases in temperature should allow for additional reaction time reductions.

Example 7

Simulated Continuous Cycle for Seeded Process

Simulated continuous tests or locked-cycle experiments were performed. The leach solution for these tests was prepared by dissolving a magnetite concentrate (Iron Ore Company of Canada) in 25% nitric acid solution. The resulting solution was then diluted with distilled water to produce a final solution having a dissolved iron content of 42-45 g/L. The resulting diluted solution contained approximately 45 g/L of free nitric acid.

The locked-cycle tests were used to simulate a continuous process via the use of a series of batch reactions. The same apparatus described above for the batch tests was used for the locked-cycle work. For the initial test in each cycle, Bayferrox™ 105M (Lanxess) was used as the initial seed material. After the first precipitation is complete, the precipitated solids are removed. At that time a portion of these solids is then separated and used as the seed material for the second precipitation in the series. This process is repeated a number of times with the same seeding ratio maintained throughout the test series. The total number of tests in the cycle is selected to ensure that the precipitated pigment solids from the final test is representative of what would be expected from a continuously operating process. Only the solids from each test are recycled to the next test in the series. The test filtrates are analyzed and then discarded.

After several repetitions (typically 5-10), the original Bayferrox™ 105M (Lanxess) solids used as seed in the first precipitation are essentially removed from the system and replaced with novel precipitate product. The higher the seed ratio that is used, the more repetitions required in the series in order to effectively eliminate the original seed material. The products from each test (solids/liquids) were analyzed according to the same procedures as were applied in the batch test procedures. These results are shown in Tables 18 and 19.

TABLE 18

Summary of continuous results.

| Test | Temp (° C.) | Seed (%) | Initial Fe (g/L) | Initial FA (g/L) | Repetitions in test series |
|---|---|---|---|---|---|
| Locked Cycle 1 | 200 | 200 | 42 | 45 | 5 |
| Locked Cycle 2 | 200 | 80 | 42 | 45 | 5 |
| Locked Cycle 3 | 200 | 350 | 45 | 45 | 8 |

TABLE 19

A summary of the colour analysis and size of the precipitates obtained from the "locked-cycle" test series in table 18.

| Test | L* | a* | b* | $d_{50}$ (microns) |
|---|---|---|---|---|
| Locked Cycle 1 | 49.87 | 25.14 | 15.56 | 0.96 |
| Locked Cycle 2 | 54.00 | 20.01 | 12.50 | 4.5 |
| Locked Cycle 3 | 50.71 | 25.88 | 16.68 | 0.90 |
| Bayferrox ™ 105M | 53.15 | 29.05 | 24.01 | 0.60 |
| Bayferrox ™ 130M | 50.67 | 25.97 | 16.46 | 0.70 |

The locked-cycle test series were performed at 200° C. with the seed ratio varying from 80% to 350%. Table 19 shows the size and colour analyses for the final precipitate produced in each test series. Once again, Bayferrox™ 105m/130m (Lanxess) pigments were included for reference. The recovery of iron from solution into the precipitated solids varied from approximately 80-90% for all of the individual tests in each locked-cycle test series.

The precipitates produced by the locked-cycle tests series using magnetite leach solutions were coarser than those produced from the single batch leach tests when similar precipitation parameters were utilized. The simulated continuous reaction results also illustrate the fact that particle size and colour parameters can be controlled by varying the seed ratio to produce pigment-grade precipitate solids. The highest seed ratio used in the locked-cycle tests produced the finest precipitate ($d_{50}$=0.90 microns). As the seed ratio was reduced, the precipitate $d_{50}$ particle size increased (0.96 at 200% seed and 4.5 microns at 80% seed). The precipitate size changes were accompanied by a corresponding colour shift between more "yellow-red" materials at high seed ratios (finer particles) and more "blue-red" at low seed ratios (coarser particles). These trends are identical to those shown in the batch process.

As understood by those skilled in the art, additional embodiments may be practiced within the scope and intent of the present disclosure of the invention. The embodiments above are intended to be illustrative and not limiting. Additional embodiments are within the claims. Although the present invention has been described with reference to particular embodiments, workers skilled in the art will recognize that changes may be made in form and detail without departing from the spirit and scope of the invention.

We claim:

1. A process for the production of ferric oxide precipitates having a particle size from about 0.1 to about 10 microns, the process comprising
    (a) obtaining an aqueous feed solution comprising iron solubilized in one member selected from the group consisting of nitric acid, sulfuric acid, and hydrochloric acid, the aqueous feed solution having a pH ranging from about 0.25 to about 2.5; and
    (b) subjecting the aqueous feed solution to a combination of
        (i) a temperature from about 100° C. to about 300° C.,
        (ii) a seeding ratio from about 20% to about 2000%, wherein the seeding ratio is a ratio of a weight of a seed solid to a weight of an expected unseeded precipitate product, and wherein the particle size of the ferric oxide precipitates is smaller than a particle size of the ferric oxide precipitates obtained with a seeding ratio of 0%, and
    pressures ranging from about 40 psig to about 1300 psig to obtain ferric oxide precipitates of the particle size from about 0.1 to about 10 microns.

2. The process of claim 1, wherein the temperature is from about 175° C. to about 240° C.

3. The process of claim 1, wherein the seeding ratio is from about 50% to about 500%.

4. The process of claim 1, wherein the selected particle size is from about 0.15 to about 2.5 microns.

5. The process of claim 1, wherein the ferric oxide precipitates are obtained in from about one minute to about 6 hours.

6. The process of claim 1, wherein the ferric oxide precipitates are obtained in from about 30 minutes to about 1 hour.

7. The process of claim 1 wherein said process is conducted at a pressure of from about 100 to about 500 psig.

8. The process of claim 1, wherein the ferric oxide precipitates are obtained from a feed solution comprising iron solubilized in nitric acid.

9. The process of claim 1, wherein the feed solution has an iron concentration of from about 5 g/L up to the onset of crystallization of a ferric salt.

10. The process of claim 1, wherein the feed solution has an iron concentration of from about 10 g/L to about 100 g/L.

11. The process of claim 1, wherein the feed solution has an iron concentration of from about 30 g/L to about 60 g/L.

12. The process of claim 1, wherein the feed solution has a free acid concentration of from about 5 g/L to about 150 g/L.

13. The process of claim 1, wherein the feed solution has a free acid concentration of from about 30 g/L to about 70 g/L.

14. The process of claim 1, wherein the ferric oxide precipitates have an L* of about 40 to about 60.

15. The process of claim 1, wherein the ferric oxide precipitates have an L* of about 49 to about 55.

16. The process of claim 1, wherein the ferric oxide precipitates have an a* of about 10 to about 40.

17. The process of claim 1, wherein the ferric oxide precipitates have an a* of about 19 to about 33.

18. The process of claim 1, wherein the ferric oxide precipitates have an b* of about 5 to about 35.

19. The process of claim 1, wherein the ferric oxide precipitates have an b* of about 12 to about 28.

20. The process of claim 1, conducted in a batch or a continuous fashion.

21. The process of claim 1, wherein the ferric oxide precipitates have a smooth surface texture.

* * * * *